United States Patent
Hayaashi et al.

(10) Patent No.: US 8,447,355 B2
(45) Date of Patent: *May 21, 2013

(54) COMMUNICATION SYSTEM, SETTLEMENT MANAGEMENT APPARATUS AND METHOD, PORTABLE INFORMATION TERMINAL AND INFORMATION PROCESSING METHOD, AND PROGRAM

(75) Inventors: Hirofumi Hayaashi, Kanagawa (JP); Kohei Yokota, Kanagawa (JP); Toru Kuwahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/605,414

(22) Filed: Sep. 6, 2012

(65) Prior Publication Data

US 2012/0323781 A1  Dec. 20, 2012

Related U.S. Application Data

(63) Continuation of application No. 12/394,145, filed on Feb. 27, 2009, now Pat. No. 8,280,435, which is a continuation of application No. 10/800,685, filed on Mar. 16, 2004, now Pat. No. 7,634,295.

(30) Foreign Application Priority Data

Mar. 19, 2003  (JP) ................................. 2003-076190

(51) Int. Cl.
*H04M 1/00* (2006.01)

(52) U.S. Cl.
USPC .................... 455/556.1; 455/41.3; 455/556.2; 455/557; 455/558; 705/64

(58) Field of Classification Search
USPC .................... 455/41.3, 556.1–558; 705/64
See application file for complete search history.

(56) References Cited

U.S. PATENT DOCUMENTS

| | | | |
|---|---|---|---|
| 6,216,015 B1 * | 4/2001 | Hymel | 455/558 |
| 6,612,488 B2 * | 9/2003 | Suzuki | 235/380 |
| 2002/0010650 A1 | 1/2002 | Herzog von Wuertemberg et al. | |
| 2002/0066042 A1 | 5/2002 | Matsumoto et al. | |
| 2002/0077907 A1 | 6/2002 | Ukai et al. | |

(Continued)

FOREIGN PATENT DOCUMENTS

| JP | 2001-101300 | 4/2001 |
|---|---|---|
| JP | 2001-116556 | 4/2001 |

(Continued)

*Primary Examiner* — Olumide T Ajibade Akonai
*Assistant Examiner* — Jaime Holliday
(74) *Attorney, Agent, or Firm* — Oblon, Spivak, McClelland, Maier & Neustadt, L.L.P.

(57) ABSTRACT

The present invention provides a communication system that enables safe and easy addition of a function for use of credit card settlement services to a portable information terminal. In this system, if a user brings his credit card close to the portable information terminal, the portable information terminal reads a card ID stored in a contactless IC card provided in the credit card. Then, the card ID is transmitted to a card management system which checks whether or not the card ID is valid. If confirming that the card ID is valid, the card management system instructs the portable information terminal to write the card ID thereto. If the user places an order of a merchandize, the card ID written to the portable information terminal is provided therefrom to use credit card settlement services.

20 Claims, 23 Drawing Sheets

U.S. PATENT DOCUMENTS

| | | |
|---|---|---|
| 2002/0130176 A1 | 9/2002 | Suzuki |
| 2002/0194137 A1* | 12/2002 | Park et al. .................. 705/64 |
| 2003/0006280 A1 | 1/2003 | Seita et al. |
| 2003/0212465 A1 | 11/2003 | Howard et al. |

FOREIGN PATENT DOCUMENTS

| | | |
|---|---|---|
| JP | 2001-266034 | 9/2001 |
| JP | 2002-056331 | 2/2002 |
| JP | 2002-099858 | 4/2002 |
| JP | 2002-150191 | 5/2002 |
| JP | 2002-150256 | 5/2002 |
| JP | 2002-230203 | 8/2002 |
| JP | 2002-269485 | 9/2002 |
| JP | 2003-044765 | 2/2003 |
| JP | 2003-44910 | 2/2003 |
| JP | 2003-051870 | 2/2003 |
| KR | 2002-0063344 A | 8/2002 |

\* cited by examiner

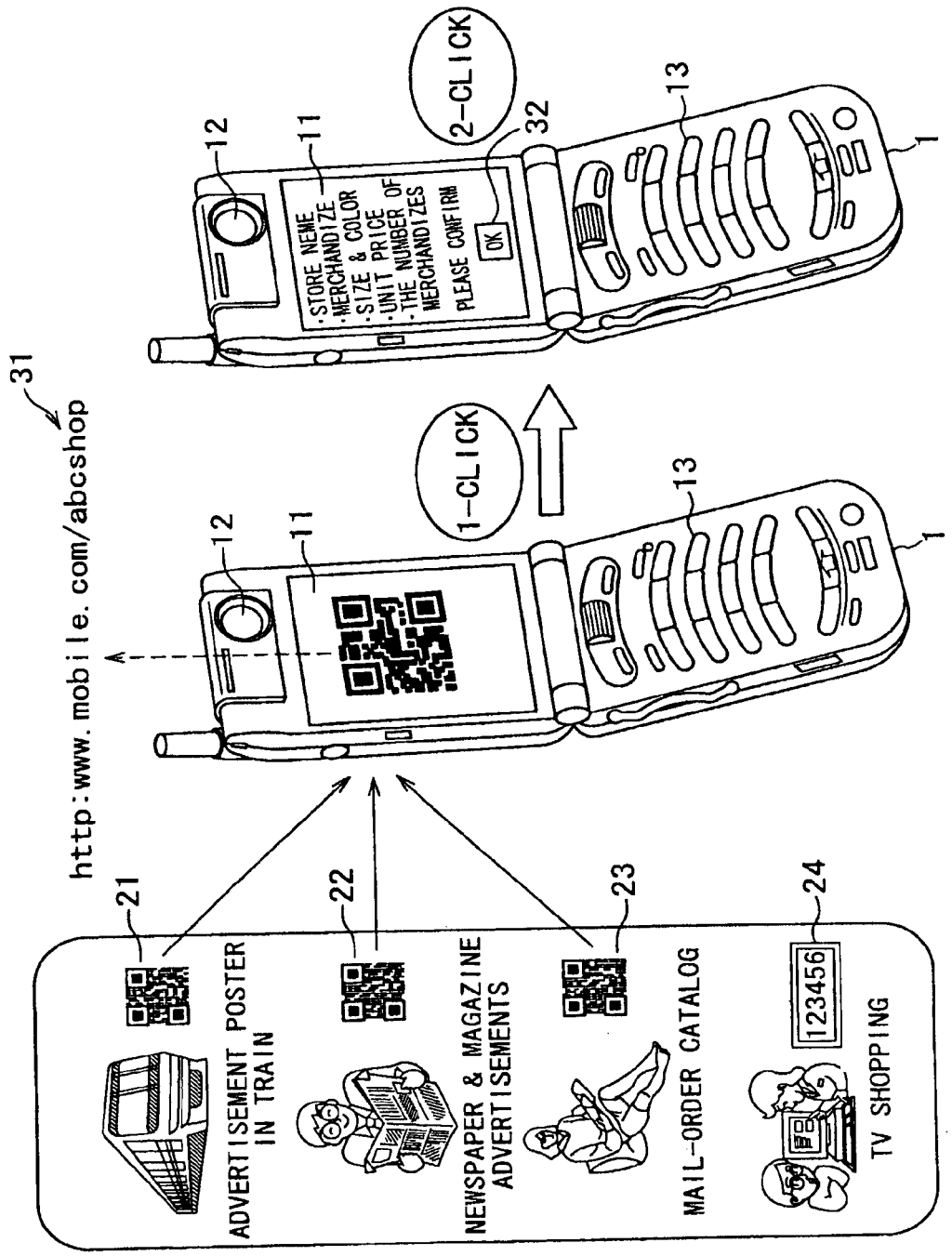

F I G. 8
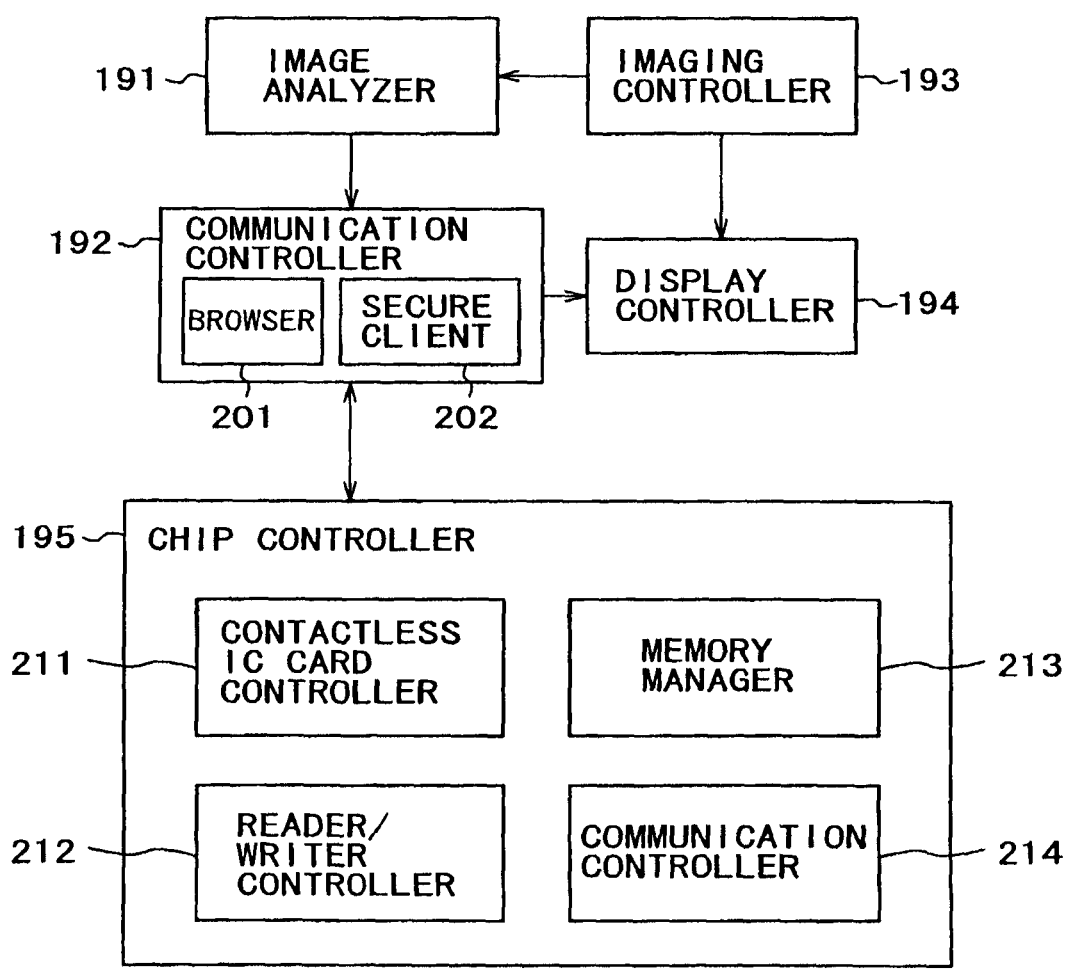

FIG. 13

| ID | CARD NO. | CARD ISSUED BY | EXPIRATION DATE | NAME | ADDRESS | MAIL ADDRESS |
|---|---|---|---|---|---|---|
| 0001 | 0000-0000-0000-0000 | JCC | 05/05 | TAMADA | TOKYO | YAMADA@A.co.jp |
| 0002 | 1111-1111-1111-1111 | Naster | 06/03 | MIURA | TOKYO | MIURA@A.co.jp |
| ... | ... | ... | ... | ... | ... | ... |

F I G. 17

| MERCHANDIZE ID | URL | MARCHANDIZE NAME | PRICE | MEMBER STORE INFORMATION | STOCK |
|---|---|---|---|---|---|
| 001 | http://www.mobile.com/abcshop/ | MAGAZINE A | ¥500 | BOOK STORE A | 50 |
| 002 | http://www.mobile.com/efgshop/ | FURNITURE B | ¥10000 | INTERIOR SHOP B | 10 |
| ... | ... | ... | ... | ... | ... |

FIG. 19

```
                                    11
┌─────────────────────────────────────┐
│                                     │
│         DIGITAL CAMERA              │
│         ORDERING SITE               │
│                                     │
│   MEMBER                            │
│   STORE NAME      : Somy            │
│                                     │
│   MERCHANDIZE                       │
│   NAME            : DSC-X           │
│                                     │
│   UNIT PRICE      : ¥30,000         │
│                                     │
│   THE NUMBER                        │
│   OF MERCHANDIZES : 1               │
│                                     │
│        WOULD YOU LIKE TO            │
│          PLACE ORDER?               │
│                                     │
│              ┌──────┐               │
│              │  OK  │               │
│              └──────┘               │
└─────────────────────────────────────┘
                  311
```

ORDER ACKNOWLEDGEMENT
MAIL

NAME OF ORDERED
MERCHANDIZE : DSC-X

PRICE : ¥30,000

NUMBER OF
MERCHANDIZES : 1

PERSON PLACED
ORDER : YAMADA

SHIPPING
ADDRESS : TOKYO ···

WOULD YOU LIKE TO
CONFIRM ORDER?

OK

321

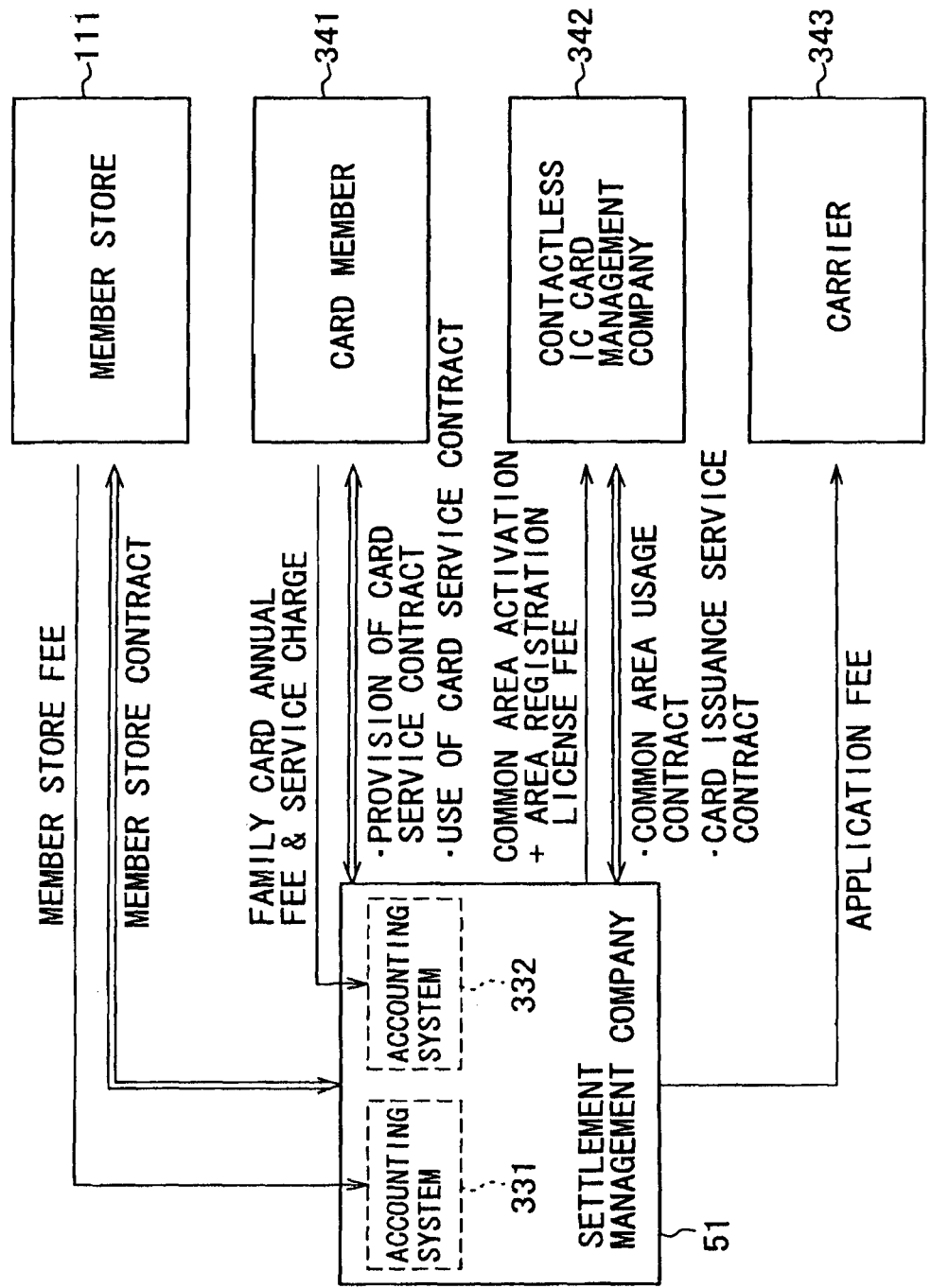

COMMUNICATION SYSTEM, SETTLEMENT MANAGEMENT APPARATUS AND METHOD, PORTABLE INFORMATION TERMINAL AND INFORMATION PROCESSING METHOD, AND PROGRAM

CROSS REFERENCES TO RELATED APPLICATIONS

This application is a continuation of and is based upon and claims the benefit of priority under 35 U.S.C. §120 for U.S. Ser. No. 12/394,145 filed Feb. 27, 2009, the entire contents of which are incorporated herein by reference. U.S. Ser. No. 12/394,145 is a continuation of U.S. Ser. No. 10/800,685, filed Mar. 16, 2004 (now U.S. Pat. No. 7,634,295) and claims the benefit of priority under 35 U.S.C. §120 from Japanese Patent Application No. 2003-076190, filed Mar. 19, 2003.

BACKGROUND OF THE INVENTION

1. Field of the Invention

The present invention generally relates to a communication system, settlement management apparatus and method, and a program. More particularly, the present invention relates to a communication system, settlement management apparatus and method, and a program, which enable addition of a function of using credit settlement services to a portable information terminal more safely and easily.

2. Description of Related Art

Recently, along with dissemination of commercial transaction conducted over the Internet, there have been realized or proposed various kinds of systems for settlement of purchased merchandizes.

For example, a settlement system using a credit card embedded with an IC chip has already been realized and is becoming widespread.

In this case, just placing a user's credit card on a reader/writer connected to a personal computer enables the user to encrypt information, which represents a credit card number, an expiration date and so on and is stored in a memory of the IC chip built in the card, and to transmit the encrypted information to a server that manages the settlement.

This can prevent leakage of a credit card number, which has been a problem in a case of simply and directly entering the card number in a browser.

Further, it has been proposed that a mobile phone of a customer having purchased a merchandize is used for settlement in a commercial transaction conducted over the Internet (see Japanese Patent Application Publication Laid-Open No. 2002-56338 (hereunder referred to as Patent Document 1)).

In a settlement system described in the Patent Document 1, information concerning a bank account of the customer is obtained from the phone number of the mobile phone used for requesting settlement. Then, charging thereto is performed. Thus, the settlement can be made without transmission/receipt of private information concerning the card number and so forth.

SUMMARY OF THE INVENTION

However, to utilize the settlement system described in the Patent Document 1, a user should register information, such as a phone number of his own mobile phone and a bank account, in a server that manages the system. It is anticipated that some users may feel resistance to registering the information on these items.

That is, even it is inevitable to register the information concerning the bank account and the credit card therein because the settlement for the purchased merchandize should be performed, many of users are not willing to provide additional private information concerning items other than the bank account and the credit card to anyone else (including the server and the like).

Thus, it has been considered that information on a credit card number and so on is preliminarily stored directly in an IC chip or memory incorporated in a mobile phone, and that thereafter, the settlement is performed by using the stored information. However, this technique has a drawback in that it is not an easy task to properly store the information while ensuring security.

For instance, If a user is permitted to register information concerning a card number and an expiration date of his own card and so on directly in a mobile phone by operating the mobile phone, the system cannot prevent what is called spoofing. That is, a rigger can easily perform spoofing by inputting the card number and the expiration date of other people's credit card.

In a case of using a related credit card incorporating an IC chip, the credit card is issued in a state in which information on the credit card number is stored therein. Thus, in this case, the above-mentioned drawback does not occur. However, in the case of newly adding a credit card function to a mobile phone or the like that a user already has, the above-mentioned drawback occurs.

Alternatively, a credit card issuing corporation may ask a user to send his mobile phone so as to store credit card information in an IC chip of the user's mobile phone on behalf of the user. However, this technique is impractical.

Accordingly, it is desirable to have a measure that enables safer and easier addition of a credit settlement function to a portable information terminal. The present invention is accomplished in view of these circumstances.

According to an embodiment of the present invention, there is provided a first communication system, which includes a settlement management apparatus that includes judging means for judging whether or not identification information assigned to a user of the portable information terminal and used for predetermined settlement is valid for using credit services which the user uses, and a storage controller for storing, the identification information in the portable information terminal if the judging means decides that the identification information is valid.

The first communication system of the present embodiment may further includes a portable information terminal that includes a reader for reading the identification information from an IC chip provided in a credit card issued from an issuer providing the credit services through wireless communication, and storing means for transmitting the identification information read by the reader to the settlement management apparatus and for storing the identification information based on an instruction issued by the settlement management apparatus if it is confirmed that the identification information is valid.

According to another embodiment of the present invention, there is provided a second communication system, which includes a settlement management apparatus that includes judging means for judging whether or not identification information assigned to a user of the portable information terminal and used for predetermined settlement is valid for using credit services which the user uses, and a storage controller for storing, if the judging means decides that the identification information is valid, the identification information in the portable information terminal.

The second communication system of the present embodiment may further includes a portable information terminal that includes a transmitter for transmitting user identifying information, according to which a user is identified, to the settlement management apparatus, and storing means for storing the identification information provided by the settlement management apparatus if the identification information managed by the settlement management apparatus in such a way as to be associated with the user identifying information transmitted by the transmitter is decided to be valid.

According to another embodiment of the present invention, there is provided a settlement management apparatus, which includes judging means for judging whether or not identification information assigned to a user of a portable information terminal and used for predetermined settlement is valid for using credit services which the user uses, and a storage controller for storing, if the judging means decides that the identification information is valid, the identification information in the portable information terminal.

In the settlement management apparatus of the present embodiment, the judging means may decide whether or not the identification information read and provided through wireless communication from an IC chip provided in a credit card issued by an issuer for providing the credit services is valid.

The settlement management apparatus of the present embodiment may further include a manager for managing the identification information in such a way as to be associated with user identifying information according to which the user is identified. In this settle management apparatus, the judging means may associate the identification information with the user identifying information transmitted from the portable information terminal and decides whether or not the identification information managed by the manager is valid.

According to another embodiment of the present invention, there is provided a settlement management method that includes a judging step of judging whether or not identification information assigned to a user of a portable information terminal and used for predetermined settlement is valid for using credit services which the user uses, and a storage control step of storing, if it is decided in the judging step that the identification information is valid, the identification information in the portable information terminal.

According to another embodiment of the present invention, there is provided a first program includes a judging step of judging whether or not identification information assigned to a user of a portable information terminal and used for predetermined settlement is valid for using credit services which the user uses, and a storage control step of storing, if it is decided in the judging step that the identification information is valid, the identification information in the portable information terminal.

According to another embodiment of the present invention, there is provided a first portable information terminal that includes a reader for reading identification information, which is assigned to a user and used for predetermined settlement, from an IC chip provided in a credit card issued from an issuer providing credit services which the user uses, through wireless communication, and storing means for transmitting the identification information read by the reader to a settlement management apparatus, which manages settlement to be performed according to the identification information, and for storing the identification information based on an instruction issued by the settlement management apparatus if it is confirmed that the identification information is valid.

The first portable information terminal of the present embodiment may further include acquisition means for acquiring a predetermined application provided from the settlement management apparatus, and a controller, implemented by the application acquired by the acquisition means, for controlling encrypting and/or decoding of communication performed between the settlement management apparatus and the terminal.

According to another embodiment of the present invention, there is provided a first information processing method that includes a reading step of reading identification information, which is assigned to a user and used for predetermined settlement, from an IC chip provided in a credit card issued from an issuer providing credit services which the user uses, through wireless communication, and a storing step of transmitting the identification information read in the reading step to a settlement management apparatus, which manages settlement to be performed according to the identification information, and for storing the identification information based on an instruction issued by the settlement management apparatus if it is confirmed that the identification information is valid.

According to another embodiment of the present invention, there is provided a second program that includes a reading step of reading identification information, which is assigned to a user and used for predetermined settlement, from an IC chip provided in a credit card issued from an issuer providing credit services which the user uses, through wireless communication, and a storing step of transmitting the identification information read in the reading step to a settlement management apparatus, which manages settlement to be performed according to the identification information, and for storing the identification information based on an instruction issued by the settlement management apparatus if it is confirmed that the identification information is valid.

According to another embodiment of the present invention, there is provided a second portable information terminal that includes a transmitter for transmitting user identifying information, according to which a user is identified, to a settlement management apparatus, which manages settlement to be performed according to identification information assigned to the user by using predetermined credit services which the user uses, and storing means for storing the identification information provided by the settlement management apparatus if the identification information managed by the settlement management apparatus in such a way as to be associated with the user identifying information transmitted by the transmitter is decided to be valid.

The second portable information terminal of the present embodiment may further include acquisition means for acquiring a predetermined application provided from the settlement management apparatus, and a controller, implemented by the application acquired by the acquisition means, for controlling encrypting or decoding of communication performed between the settlement management apparatus and the terminal.

According to another embodiment of the present invention, there is provided a second information processing method that includes a transmitting step of transmitting user identifying information, according to which a user is identified, to a settlement management apparatus, which manages settlement to be performed according to identification information assigned to the user by using predetermined credit services which the user uses, and storing means for storing the identification information provided by the settlement management apparatus if the identification information managed by the settlement management apparatus in such a way as to be associated with the user identifying information transmitted in the transmitting step is decided to be valid.

According to another embodiment of the present invention, there is provided a third program that includes a transmitting step of transmitting user identifying information, according to which a user is identified, to a settlement management apparatus, which manages settlement to be performed according to identification information assigned to the user by using predetermined credit services which the user uses, and a storing step of storing the identification information provided by the settlement management apparatus if the identification information managed by the settlement management apparatus in such a way as to be associated with the user identifying information transmitted in the transmitting step is decided to be valid.

In the settlement management apparatus of the first communication system of the present embodiment, the judging means judges whether or not identification information assigned to a user of the portable information terminal and used for predetermined settlement is valid for using credit services which the user uses. If the judging means decides that the identification information is valid, the storage controller causes the portable information terminal to store the identification information. In the portable information terminal, the reader read the identification information from an IC chip provided in a credit card issued from an issuer providing the credit services through wireless communication. The storing means transmits the read identification information to the settlement management apparatus.

If it is confirmed that the identification information is valid, the storing means stores the identification information based on an instruction issued by the settlement management apparatus.

In the second communication system of the present embodiment, the judging means judges whether or not identification information assigned to a user of the portable information terminal and used for predetermined settlement is valid for using credit services to which the user join. If the judging means decides that the identification information is valid, the storage controller causes the portable information terminal to store the identification information. In the portable information terminal, the transmitter transmits user identifying information, according to which a user is identified, to the settlement management apparatus. If the identification information managed by the settlement management apparatus in such a way as to be associated with the user identifying information transmitted by the transmitter is decided to be valid, the storing means stores the identification information provided by the settlement management apparatus.

In the settlement management apparatus, the settlement management method and the program according to the present embodiments, it is judged whether or not identification information assigned to a user of a portable information terminal and used for predetermined settlement is valid for using credit services which the user uses. If the it is decided that the identification information is valid, the identification information is stored in the portable information terminal.

In the first portable information terminal, the information processing method and the program of the present embodiments, identification information, which is assigned to a user and used for predetermined settlement, is read from an IC chip provided in a credit card issued from an issuer providing credit services which the user uses, through wireless communication. The identification information read is transmitted to a settlement management apparatus, which manages settlement to be performed according to the identification information. The identification information is stored based on an instruction issued by the settlement management apparatus if it is confirmed that the identification information is valid.

In the second portable information terminal, the information processing method and the program according to the present embodiments, user identifying information, according to which a user is identified, is transmitted to a settlement management apparatus, which manages settlement to be performed according to identification information assigned to the user by using predetermined credit services which the user uses. The identification information provided by the settlement management apparatus is stored if the identification information managed by the settlement management apparatus in such a way as to be associated with the user identifying information transmitted is decided to be valid.

According to the above-described embodiments of the present invention, safer settlement may be achieved by using a portable information terminal.

Further, according to the above-described embodiments of the present invention, addition of settlement services to a portable information terminal is more safely and easily achieved.

BRIEF DESCRIPTION OF THE DRAWINGS

These and other objects, features and advantages of the present invention will become more apparent in light of the following detailed description of a best mode embodiment thereof, as illustrated in the accompanying drawings:

FIG. 1 is a diagram illustrating an example of an operation to be performed when a merchandise is ordered;

FIG. 8 is a block diagram illustrating an example of a functional constitution of a mobile phone;

FIG. 13 is a table illustrating an example of information registered in a member master file;

FIG. 17 is a table illustrating an example of information registered in a merchandise master file;

FIG. 19 is a diagram illustrating an example of an ordering site screen;

FIG. 21 is a diagram illustrating an example of indication of an order acknowledgement mail;

FIG. 22 is a diagram illustrating contact relations and money transfers in a sales system to which the present invention is applied.

Figure 2A:
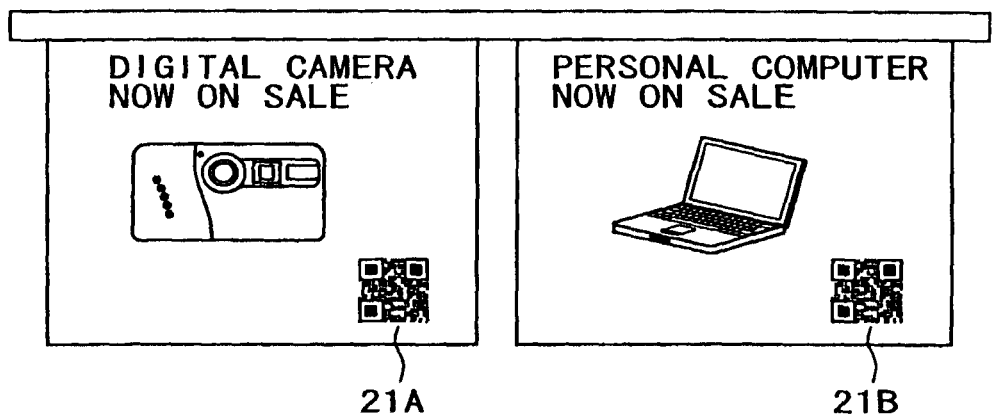
FIGS. 2A and 2B are diagrams illustrating examples of advertising media.

A more complete appreciation of the invention and many of the attendant advantages thereof will be readily obtained as the same becomes better understood by reference to the following detailed description when considered in connection with the accompanying drawings, wherein:

DETAILED DESCRIPTION OF THE PREFERRED EMBODIMENTS

Referring now to the drawings, wherein like reference numerals designate identical or corresponding parts throughout the several views.

FIG. 1 is a diagram illustrating an example of an operation to be performed in a sales system, to which the present invention is applied, if a merchandise is ordered.

In the sales system to which the present invention is applied, a user can place an order of a desired merchandize (a purchase order thereof or an advance order thereof) by using a mobile phone 1 from a place where the user has gone, or from the user's home.

More specifically, the user can place an order of a merchandize associated with a two-dimensional barcode, an image of which is taken by a camera 12 provided in the mobile phone 1. The two-dimensional barcode is issued by, for example, a company that manages the sales system. As illustrated in FIG. 1, the two-dimensional barcode is printed on various advertising media, such as an advertisement poster in a train, newspaper and magazine advertisements, and mail-order catalogs.

Figure 2B:
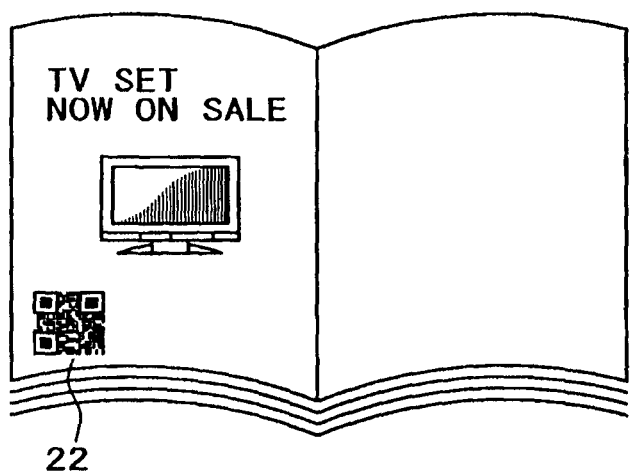

FIG. 2A is a diagram showing an example of an advertisement poster in a train. FIG. 2B is a diagram showing an example of a magazine advertisement. As shown in these figures, two-dimensional barcodes are printed at predetermined places, such as those around pictures and descriptions of merchandizes.

An advertisement poster shown in a left side part of FIG. 2A relates to a digital camera, while an advertisement poster shown in a right side part thereof relates to a personal computer. In the case illustrated in FIG. 2A, each of two-dimensional barcodes 21A and 21B embedded with an address (a URL (Uniform Resource Locator)) of an ordering site, at which a procedure of ordering an associated one of merchandizes described in the advertisements can be done, is printed at a rightwardly lower part of an associated one of the advertisements, as viewed in this figure.

Therefore, if seeing the left-side advertisement shown in FIG. 2A and purchasing the digital camera, a user can cause the mobile phone 1 to display an ordering site screen therein by taking an image of the two-dimensional barcode 21A. Further, the user can cause the mobile phone 1 to display an ordering site screen for ordering the personal computer by taking an image of the two-dimensional barcode 21B printed on the right-side advertisement poster.

Similarly, the user can cause the mobile phone 1 to display an ordering site screen, which is used for ordering a television set described in an advertisement published in a magazine shown in FIG. 2B, therein by using a two-dimensional barcode 22 printed thereon. Thus, for instance, a single two-dimensional barcode is associated with a single merchandize.

That is, in the mobile phone 1, analysis is performed on the taken image of the two-dimensional barcode if the user designates an access to the ordering site. Thus, the user obtains URL represented by a monochrome pattern. Then, an access to an ordering site designated by the obtained URL is made thorough a mobile phone network.

In the example shown in FIG. 1, a URL "http://www.mobile.com/abcshop" 31 is obtained from the taken image of the two-dimensional barcode. An access to an ordering site designated by the URL 31 is instructed by a first click. In response to this, the ordering site screen is displayed in a display unit 11 of the mobile phone 1, as indicated by a reverse arrow.

For example, an ordering button 32 to be operated to order a merchandize is displayed in the ordering site screen together with merchandize information on the name of a member store (a company, a shop or the like affiliated to a service of purchase of merchandizes using a mobile phone), a merchandize name, a size, a color, a unit price, and so on, in such a way as to be able to depress an operating button 13 by a single operation (or click).

Thus, after taking an image of the two-dimensional barcode 21, the user can cause the mobile phone 1 to display the ordering site screen for performing the predetermined merchandise purchase procedure by a first click (a single operation of the operating button 13), and also can order a merchandize by a second click.

Figure 4:
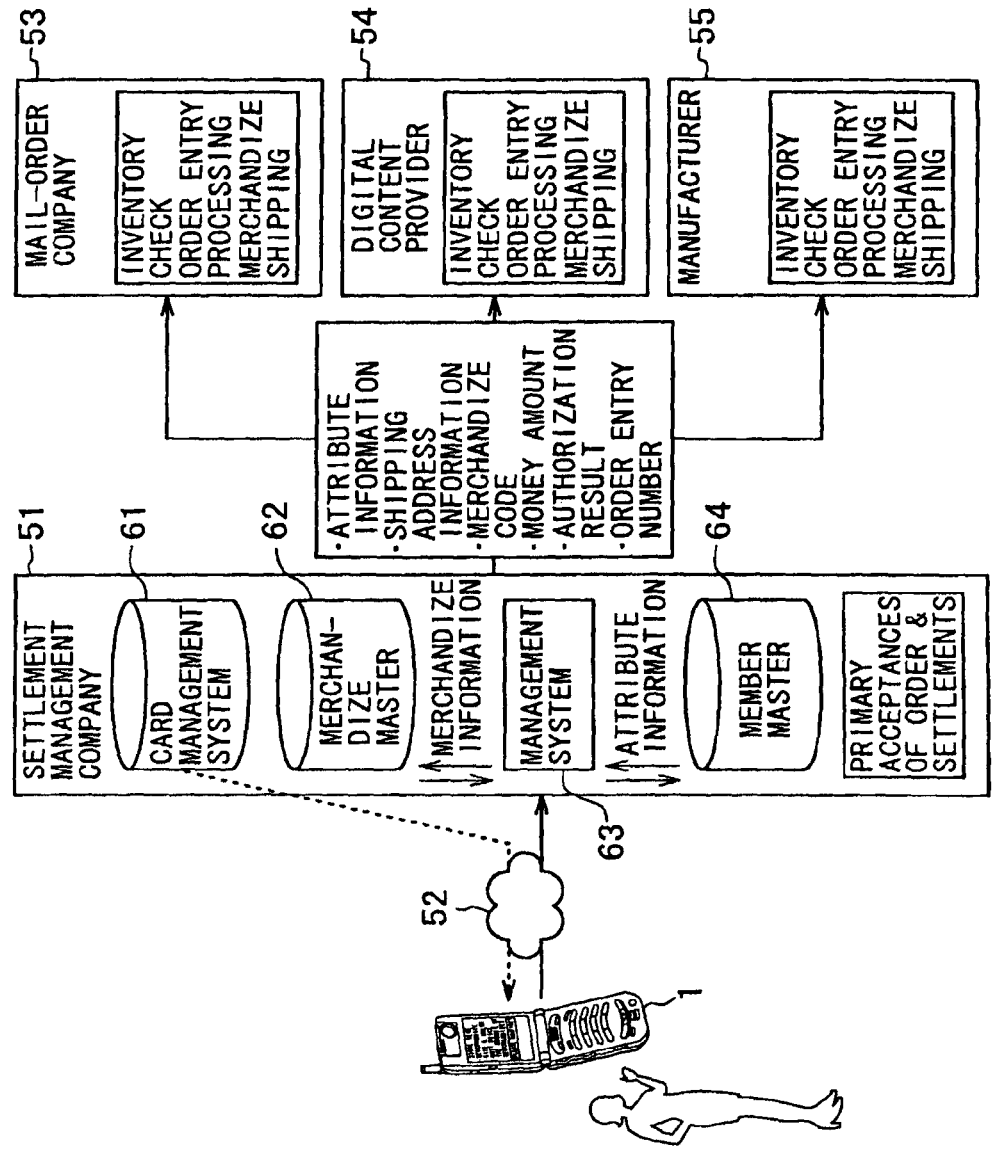
FIG. 4 is a diagram illustrating an example of a configuration of a sales system to which the present invention is applied.

Information on the merchandise ordered by the user, and information on settlement for the merchandize are transmitted to a settlement management company 51 for managing the sales system (see FIG. 4). For instance, merchandize identification information and information representing the number of the merchandizes are transmitted as the information on the merchandize. Identification information representing a card ID issued by the company 51 that provides credit services, a member of which the user has become, is automatically transmitted as the information on the settlement, independent of the user's input operation. It is, therefore, necessary to register the card ID of the user's credit card in the mobile phone 1 before the user uses this sales system.

Figure 3A:
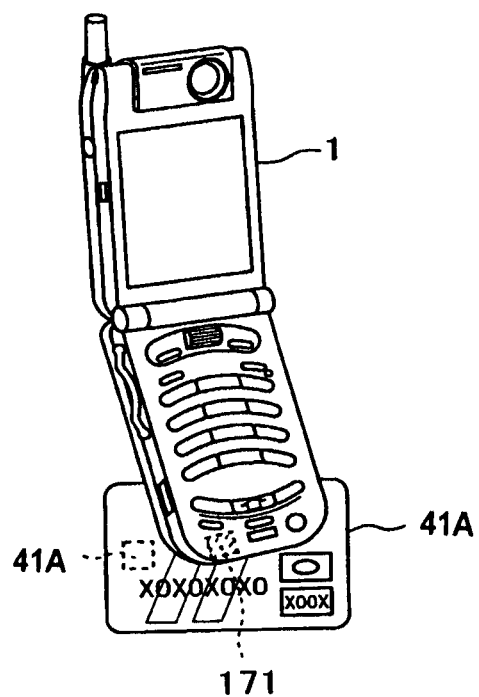
FIGS. 3A and 3B are diagrams illustrating an operation of registering a card ID in a mobile phone.

FIG. 3A is a diagram illustrating an example of an operation of registering the card ID in the mobile phone 1.

As illustrated in FIG. 3A, the registration of the card ID in the mobile phone 1 is performed by, for example, placing the user's credit card 41 over the mobile phone 1 according to a predetermined prompt.

Figure 3B:
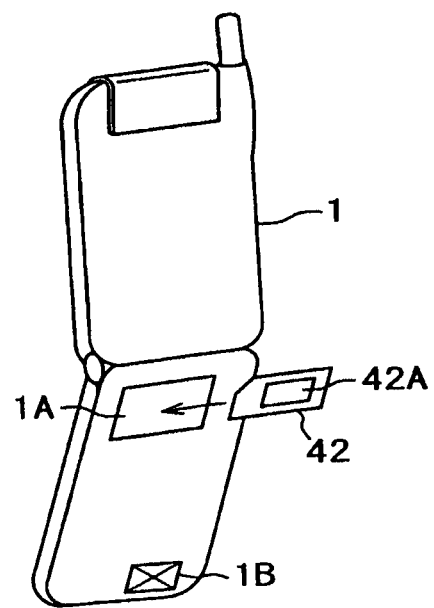

As shown in FIG. 3A, the user brings a contactless IC card reader/writer chip 171 (see FIG. 7), which is built into the mobile phone 1, close to a contactless IC chip 41A provided in the credit card 41. For instance, as shown in FIG. 3B, a mark 1B indicating the presence of the contactless IC card reader/writer chip 171 in the mobile phone 1 is printed on a part of a surface (in this case, a lower rear surface) of a casing of the mobile phone 1 so that this part corresponds to a place in which the contactless IC card reader/writer chip 171 is incorporated. The user register the card ID by bring this mark 1B to the contactless IC chip 41A.

When the user brings the mark 1B (corresponding to the contactless IC card reader/writer chip 171) close to the contactless IC chi 41A, the card ID stored in the contactless IC chip 41A provided in the credit card 41 is read by the contactless IC card reader/writer chip 171 through wireless communication. Subsequently, the read card IC is transmitted from the mobile phone 1 to a predetermined system provided in the settlement management company 51 through the mobile phone network. Then, the card ID is registered in the contactless IC card reader/writer chip 171 of the mobile phone 1 according to an instruction issued from the system after authentication of the card ID. In the system of the settlement management company 51, information on the card number, the expiration date, the user name and so on of the credit card 41 is managed by being associated with the card ID.

In this system, for security reasons, the credit card number is not directly stored in the credit card 41. Thus, information converted to the card ID is read to the mobile phone 1. However, If the credit card number is directly stored in the card, the credit card number may be read.

Thus, the user can pay for the purchased merchandise by using the mobile phone 1 as a family card of his credit card 41. An operation of registering a card ID read from the contactless IC chip 41A of the credit card 41 will be described in detail later. FIG. 3B is a diagram illustrating another example of an operation of registering a card ID in the mobile phone 1. In this example, the registration of the card ID is performed by inserting a SIM (Subscriber Identity Module) card 42 into a slot 1A formed in a rear surface portion of the mobile phone 1. The slot 1A appears if, for example, a predetermined lid member is removed therefrom. FIG. 3B shows an external view thereof.

When the SIM card 42 is inserted into the slot 1A, the card ID stored in the chip 42A, which is provided in the SIM card 42, is read by the mobile phone 1 and then stored in the memory of the mobile phone 1.

Thus, the card ID may be registered in the mobile phone 1 by performing either a contactless-type registration operation (see FIG. 3A) or a contact-type registration operation (see FIG. 3B).

The user can access directly the predetermined ordering site, which is associated with the purchased merchandise, according to the two-dimensional barcode, whose image is taken by the camera 12 of the mobile phone 1, and perform a settlement process by using the card ID registered in the mobile phone 1 in the above-mentioned manner without performing a search therefor through a search page. Consequently, the user can easily perform a merchandise ordering procedure without spatial constraints.

Further, the user can readily apply purchase of the merchandize. Thus, a dealer of the merchandize can anticipate increase in sales of the merchandize and thus can make a profit by selling the merchandizes.

Furthermore, in the example of FIG. 1, when the user inputs a merchandise code 24 of a merchandize shown on a TV shopping program, the address of an ordering site is searched for according to the merchandise code 24. Then, an access to the ordering site is automatically made according to the obtained address. Thus, the user can cause the mobile phone 1 to display an ordering site screen by a very simple operation, for example, only by entering a number consisting of a predetermined number of digits.

In this case, the corresponding relation between the merchandise code 24 and the address of the ordering site is managed by, for instance, a system of the settlement management company 51.

FIG. 4 is a diagram illustrating an example of the configuration of a sales system to which the present invention is applied. Each of components, which are the same as those of FIG. 1, is designated by the same reference numeral as that used for designating a corresponding component of FIG. 1.

The settlement management company 51 has a card management system 61, a merchandize master file 62, a management system 63, and a member master file 64, and manages primary entry of orders of merchandizes and settlements.

The card management system 61 provides the mobile phone 1 with a mobile settlement application for utilizing this sales system, and also manages card IDs stored in the contactless IC card reader/writer chip of the mobile phone 1. Operations of downloading of the mobile settlement application (to the mobile phone 1) and of writing the card IDs are performed through a mobile phone network 52, as indicated by broken lines.

The merchandize master file 62 manages information on merchandizes to be sold to users. As will be described later, merchandize information managed by the merchandize master file 62 is registered by a member store (a manufacturer or a dealer), which is a distribution source. That is, the settlement management company 51 has a role of intermediating between member stores, which serve as clients asking for sales of merchandizes, and users.

The management system 63 manages various kinds of processing, such as entries of orders by users (the mobile phones 1) and placements of orders to member stores by a mail-order company 53, a digital content provider 54, a manufacturer 55, and so on.

For example, if identification information of an ordered merchandize and information representing a card ID are transmitted form the mobile phone 1, the management system 63 acquires merchandize information on the distribution source for selling the merchandize and on the price of the merchandize from the merchandize master file 62 according to the identification information of the merchandize. The management system 63 obtains attribute information on the card number and the expiration date of the user's credit card from the member master file 64 according to the card ID. The management system 63 appropriately order information, which includes attribute information, to the mail-order company 53, the digital content provider 54, and the manufacturer 55, and asks for shipping the merchandize. The order information transmitted from the management system 63 includes shipping address information, information representing a merchandize code, a result of checking credit (an authorization result), and an order entry number.

The member master file 64 manages attribute information (credit service information), which represents the card number of the credit card issued to the user having the mobile phone 1, by associating the card number with the card ID. The attribute information managed by the member master file 64 may be registered by the user. Alternatively, the attribute information may be obtained from a database of a credit service company. For instance, If the settlement management company 51 performs also a credit card issuance service, the attribute information on the card number and so on is obtained from the database.

FIG. 4 shows the mail-order company 53, the digital content provider 54, and the manufacturer 55 as the member stores of the sales system managed by the settlement management company 51. These member stores perform inventory check, order entry, and merchandize dispatch arrangement.

Figure 5:
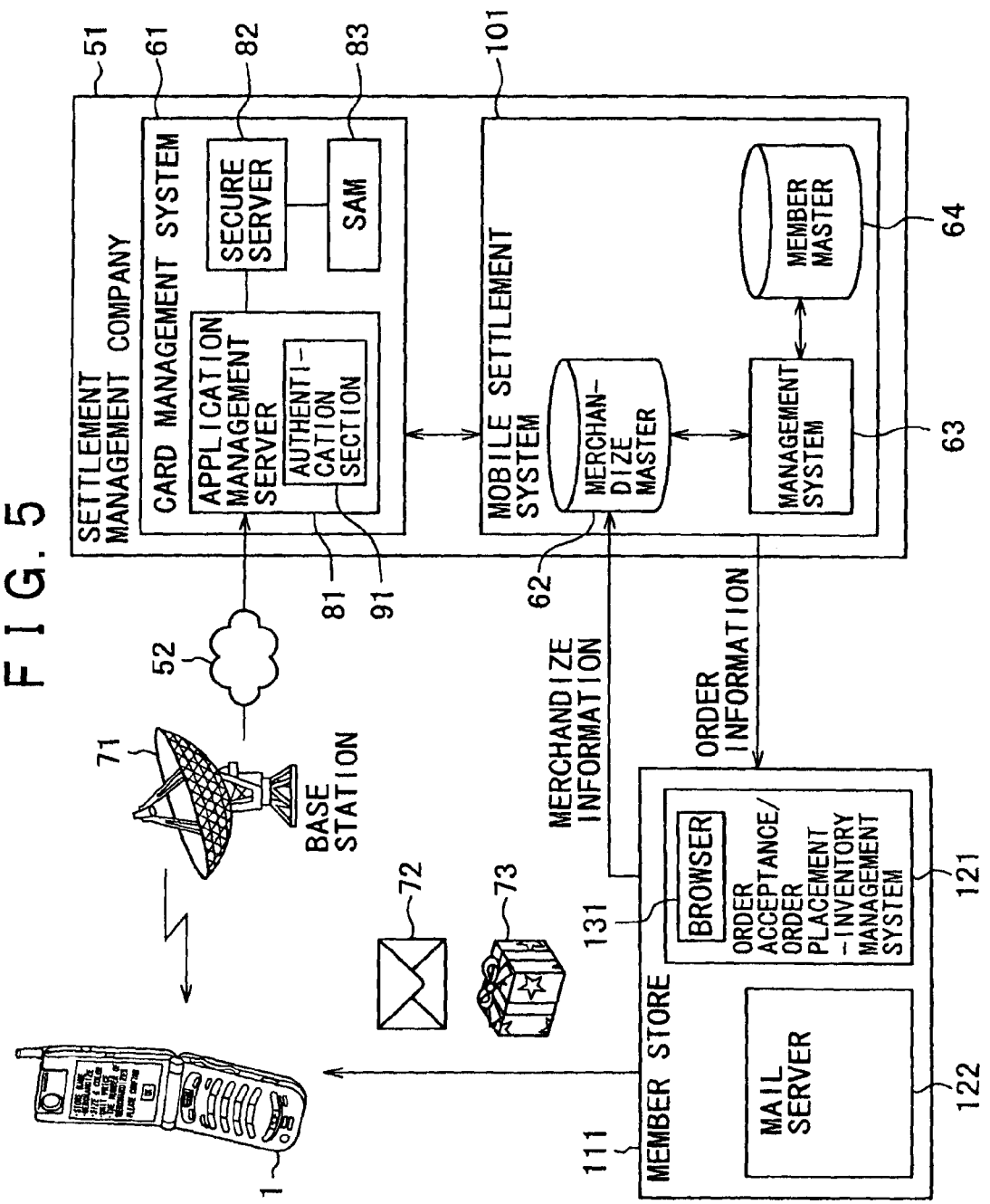
FIG. 5 is a diagram illustrating an example of a detailed configuration of each of a settlement management company and a member store.

FIG. 5 is a diagram illustrating an example of a more detail configuration of each of systems provided in the settlement management company 51 and the member store 111 (the mail-order company 53, the digital content provider 54, the manufacturer 55 or the like).

An application management server 81 of the card management system 61 of the settlement management company 51 manages downloading of the mobile settlement application, and also provides the mobile settlement application to the mobile phone 1 through a base station 71 and the mobile phone network 52. The application management server 81 has an authentication section 91, which checks the validity of the card ID and performs user authentication according to a password and ID.

A secure server 82 performs encrypted communication with a secure client 202 (see FIG. 8), which is implemented in the mobile phone 1, according to a predetermined protocol by being coupled with HTTP (Hyper Text Transfer Protocol) communication. After communication by the secure server 82 is established, writing of information by a SAM (Secure Application Module) 83 to the contactless IC card reader/writer chip 171 is enabled.

After the authentication and so forth of the contactless IC card reader/writer chip 171 (see FIG. 7) are performed, the SAM 83 generates a predetermined command and performs reading of information stored in the contactless IC card reader/writer chip 171 and writing of information thereto. The writing of data to the contactless IC card reader/writer chip 171 is enabled only by a device provided with a module having a function similar to that of the SAM 83.

The mobile settlement system 101 includes the merchandise master file 62, the management system 63 and the member master file 64.

The merchandise master file 62 stores merchandise information transmitted from a browser 131 of an order entry/order placement/inventory management system 121, which is provided in the member store 111. That is, each of the member stores can register information on the merchandise, the sales of which is asked for to the settlement management company 51, from a screen displayed by the browser.

If an employee instructs the order entry/order placement/inventory management system 121 to access a merchandise information registration site managed by the management system 63, the system 121 accesses the registration site. Then, the system 121 causes the browser to display a registration site screen. Subsequently, the order entry/order placement/inventory management system 121 transmits the merchandise information, which is inputted to the screen, to the management system 63 thereby to register the merchandise information therein.

The order entry/order placement/inventory management system 121 receives order information transmitted from the management system 63 and performs a predetermined order entry process and a predetermined process of shipping a merchandise 73. For example, the order entry/order placement/inventory management system 121 transmits an order acknowledgement mail 72 to the mobile phone 1 form a mail server 122, and manages the inventory of the merchandise as the order entry process.

Figure 6:
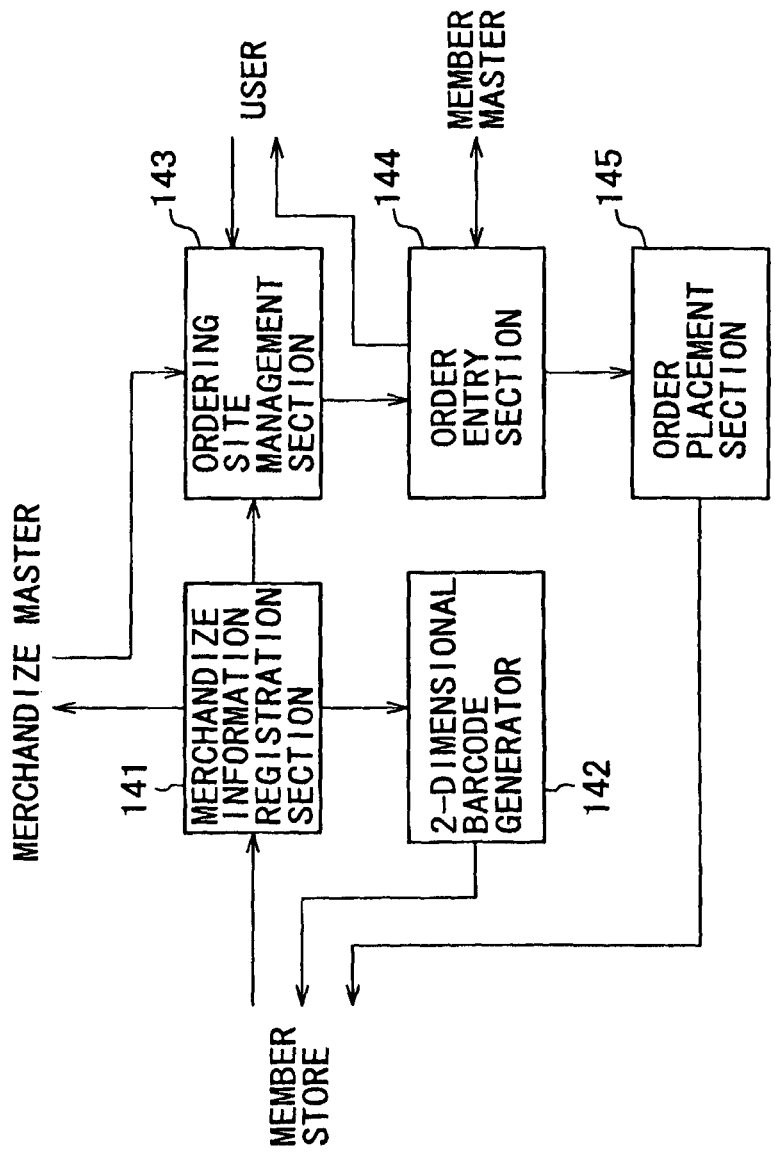
FIG. 6 is a block diagram illustrating an example of a functional constitution of a management system shown in FIG. 5.

FIG. 6 is a block diagram illustrating an example of a functional constitution of a management system 63 shown in FIG. 4 or 5.

A merchandize information registration section 141 receives the merchandize information transmitted from the browser 131 of the order entry/order placement/inventory management system 121 and then registers the received merchandize information in the merchandise master file 62. The merchandize information registered in the merchandize master file 62 by the merchandize information registration section 141 is appropriately outputted to a two-dimensional barcode generator 142 and an ordering site management section 143.

The two-dimensional barcode generator 142 generates a graphic image of a two-dimensional barcode designating URL of an ordering site in response to fact that the merchandize information is registered and the ordering site for the merchandise is provided by the order entry/order placement/inventory management system 121. The two-dimensional barcode generated by the two-dimensional barcode generator 142 is issued to the member store 111 and an advertising agent for advertising the merchandize provided by the member store 111 as a representative.

The ordering site management section 143 provides an ordering site, at which an ordering merchandize procedure can be performed, in response to the registration of merchandise information. If an order of a merchandise is placed by a user having accessed the ordering site, the ordering site management section 143 acquires detail information on the merchandize from the merchandize master file 62 simultaneously with the order placement according to merchandise identification information transmitted from the mobile phone 1. Then, the ordering site management section 143 outputs the acquired merchandize information to an order entry section 144, and also outputs the card ID transmitted from the mobile phone 1 to the order entry section 144.

The order entry section 144 obtains attribute information concerning the card number, the expiration date, and the issuer of the user's credit card from the member master file 64 according to the card ID supplied from the ordering site management section 143, and checks credit, if necessary. If the checking of credit is successful, the order entry section 144 outputs the merchandise information supplied from the ordering site management section 143 together with the attribute information, and asks an order placement section 145 for placement of an order of the merchandise to the member store 111.

The order placement section 145 transmits the order information to the member store 111 and asks the member store 111 for shipping of the merchandise.

Figure 7:
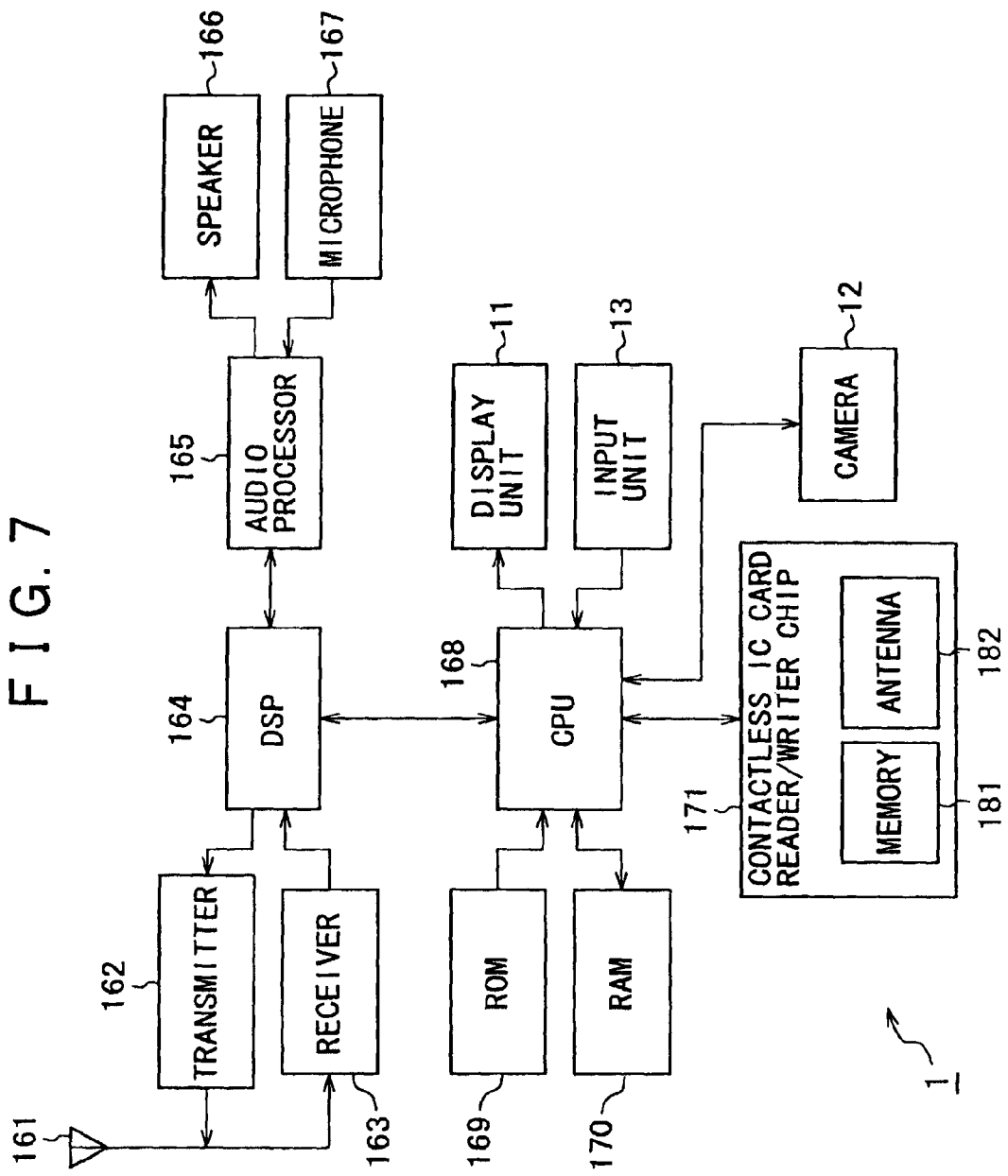
FIG. 7 is a block diagram illustrating an example of a configuration of a mobile phone.

FIG. 7 is a block diagram illustrating an example of a configuration of the mobile phone 1.

A CPU (Central Processing Unit) 168 loads a control program, which is stored in a ROM (Read-Only Memory) 169, into a RAM (Random Access Memory) 170, and controls an operation of the entire mobile phone 1 according to the control program. For instance, the CPU 168 controls a DSP (Digital Signal Processor) 164 according to an instruction issued from the user and also controls communication performed through the base station 71 and the mobile phone network 52.

A transmitter 162 and a receiver 163 perform communication pursuant to, for example, a PDC (Personal Digital Cellular) system or a W-CDMA (Wideband-Code Division Multiple Access) system.

If audio information is supplied from the DSP 164, the transmitter 162 performs predetermined processes, such as an analog-to-digital conversion and a frequency conversion, and then transmits obtained audio signals from an antenna 161 through a radio channel having a predetermined transmission carrier frequency, which is selected by the base station 71.

The receiver 163 amplifies RF signals received by the antenna 161, for instance, in an audio call mode, and performs predetermined processes, such as a frequency conversion and an analog-to-digital conversion. Subsequently, the receiver 163 outputs obtained audio information to a DSP 164.

The DSP 164 performs, for instance, spectrum dispreading on the audio information supplied from the receiver 163, and subsequently outputs obtained data to an audio processor 165. The DSP 164 also performs spectrum spreading on the audio information supplied from the audio processor 165, and then outputs obtained data to the transmitter 162.

The audio processor 165 converts voices of the user, which are collected by a microphone 167, into audio information, and outputs the audio information to the DSP 164. The audio processor 165 converts the audio information, which is supplied from the DSP 164, into analog audio signals, and outputs associated audio signals from a speaker 166.

The display unit 11 includes a LCD (Liquid Crystal Display). According to information supplied from the CPU 168, the display unit 11 displays an associated screen.

The camera 1200 takes an image under the control of the CPU 168 and outputs the taken image to the CPU 168.

The input unit 13 detects an input to a numeric keypad, and various buttons, such as a talk button and a power button, which are provided on a surface of a casing of the mobile phone, and outputs an associated signal to the CPU 168.

The contactless IC card reader/writer chip 171 is a one-chip module implementing the functions of serving as a contactless IC card for the external reader/writer, and of serving as a reader/writer for the external contactless IC card.

For example, If the function of a contactless IC card is available, the contactless IC card reader/writer chip 171 performs communication with the external reader/writer in a contactless manner, and provides predetermined information saved in the memory 181. On the other hand, If the function of serving as a reader/writer is available, the contactless IC card reader/writer chip 171 performs communication with the contactless IC card, which is provided in the credit card placed over (or brought close to) the mobile phone 1, in a contactless manner and also performs reading and writing of various kinds of information saved in the memory of the contactless IC card.

Furthermore, although FIG. 7 shows only one antenna 182, the mobile phone may be provided with an antenna, which is used if the contactless IC card reader/writer chip 171 functions as a contactless IC card, and another antenna, which is used if the contactless IC card reader/writer chip 171 functions as a reader/writer.

FIG. 8 is a block diagram illustrating an example of a functional constitution of the mobile phone 1.

Functional sections shown in FIG. 8 are implemented by executing predetermined programs by the CPU 168 and a CPU (not shown) of the contactless IC card reader/writer chip 171. For instance, an image analyzer 191, a communication controller 192, an imaging controller 193, and a display controller 194 are implemented by executing a mobile settlement application downloaded from the application management server 81.

The image analyzer 191 analyzes a monochrome pattern of the two-dimensional barcode supplied from an imaging controller 193, and obtains a URL included in the two-dimensional barcode. The URL obtained by the image analyzer 191 is outputted to a communication controller 192.

The communication controller 192 controls the transmitter 162 and the receiver 163 and performs HTTP communication with the card management system 61 of the settlement management company 51 by using the browser 201. The communication controller 192 also controls encryption and decoding of communication between the secure sever 82 and the secure client 202.

The display controller 194 controls indication displayed in the display unit 11. For example, the display controller 194 causes the display unit 11 to display the ordering site screen accessed by analyzing the two-dimensional barcode.

A contactless IC card controller 211 of a chip controller 195 implements the function of serving as a contactless IC card by controlling the contactless IC card reader/writer chip 171. For instance, the contactless IC card controller 211 provides the information stored in the memory 181 in response to a request from an external reader/writer. The reader/writer controller 212 implements the function of serving as a contactless IC card reader/writer and manages data stored in an external contactless IC card.

A memory manager 213 manages reading of the information stored in the memory 181 and writing thereof to the memory 181.

Figure 9:
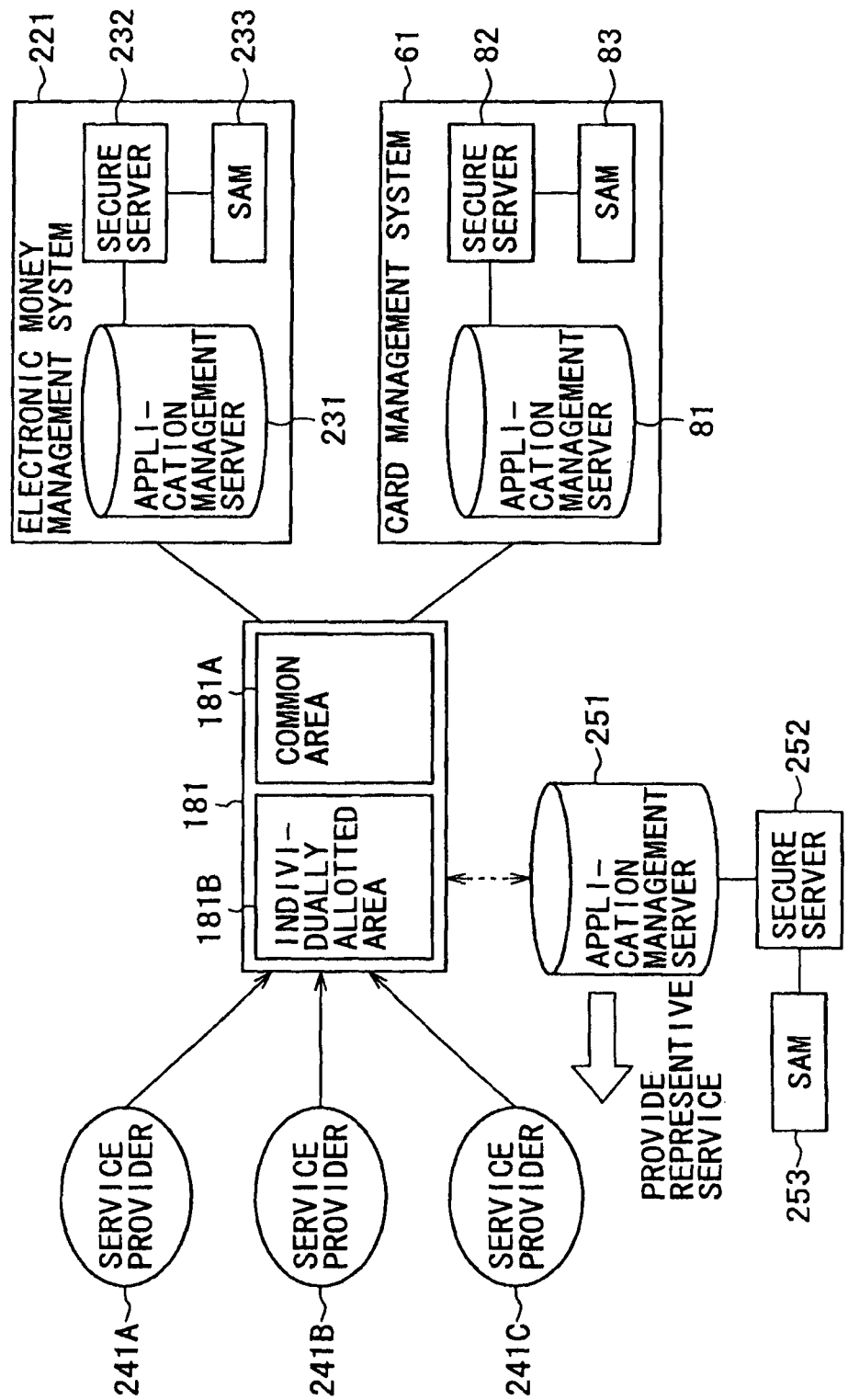
FIG. 9 is a diagram illustrating an example of areas formed in a memory.

FIG. 9 is a diagram illustrating an example of the memory 181 managed by the memory manager 213.

As shown in this figure, a common area 181A and an individually allotted area 181B are formed in the memory 181. The common area 181A is formed so that each of applications utilizing the contactless IC card reader/writer chip 171 can freely form a region in which data is stored. The individually allotted area 181B is formed in such a way as to be preliminarily and exclusively allotted to a predetermined company, such as a carrier of the mobile phone 1.

For example, information representing a card ID and so forth is stored in the common area 181A according to an instruction from the SAM 83 of the card management system 61. If the settlement management company 51 also performs issuance of electronic money, electronic money information and the like is stored in the common area 181A according to an instruction from SAM 233 of the electronic money management system 181 for managing the issuance thereof.

On the other hand, for instance, for example, information supplied from service providers, which are managed by the carrier of the mobile phone 1, is stored in the individually allotted area 181B.

Furthermore, as above-mentioned, only a system having a secure server can perform encrypted communication between this system and the secure client 202 of the mobile phone 1. Additionally, only a system having a SAM can write predetermined information to the memory 181. Therefore, the settlement management company 51 may offer a pay service (a communication representative service) of providing a communication management system, which includes an application management system 251, a secure server 252, and SAM 253, to service providers 201A to 201C.

Returning to the description of FIG. 8, a communication controller 214 controls a load on the antenna 182 according to instructions from the contactless IC card controller 211 and the reader/writer controller 212. The communication controller 214 also controls short-range radio communication between an external reader/writer and an external contactless IC card.

Figure 10:
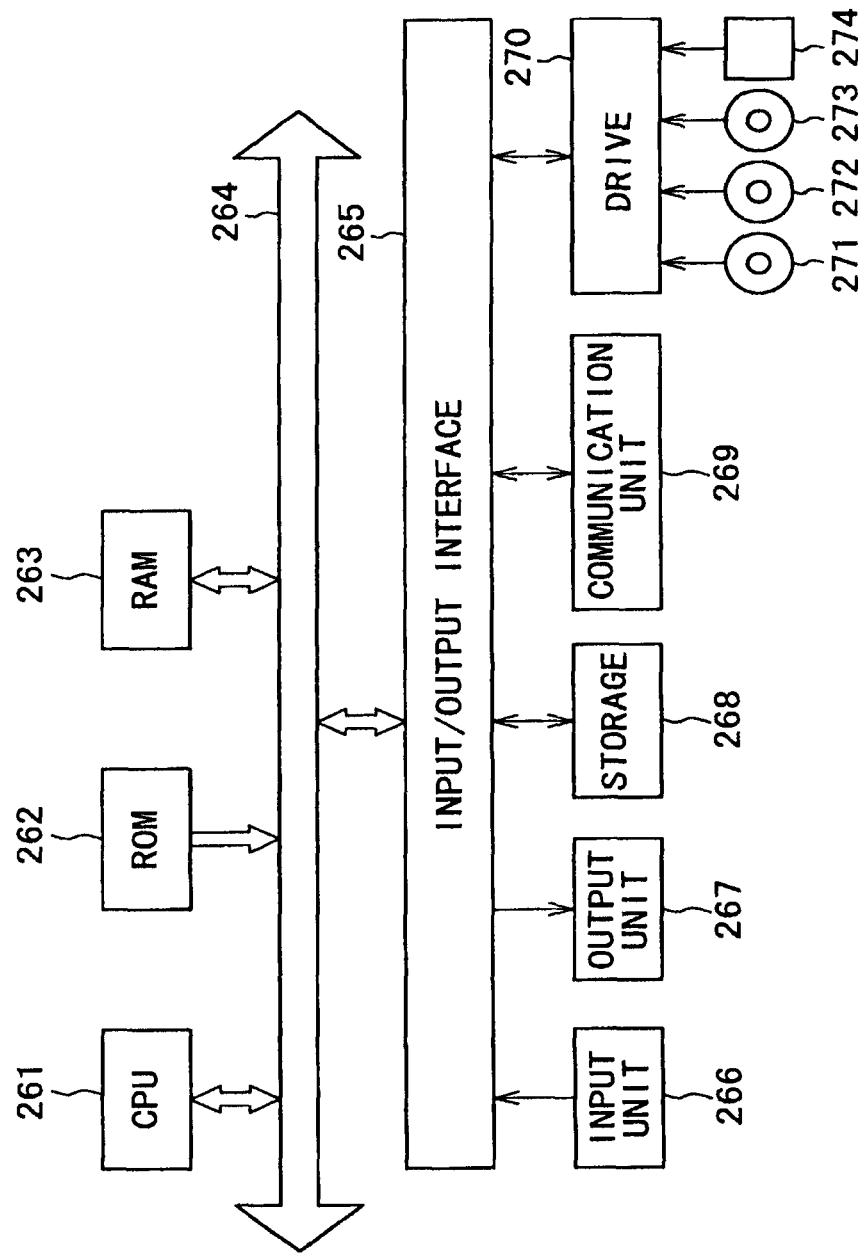
FIG. 10 is a block diagram illustrating an example of a configuration of a personal computer.

Each of the systems shown in FIGS. 4 and 5 other than the mobile phone 1 is implemented by, for example, a single personal computer, as illustrated in FIG. 10, or by cooperation of a plurality of personal computers.

A CPU 261 performs various processes according to programs loaded from a memory 268 to RAM 263. Data needed for performing the various processes by the CPU 261 is appropriately stored in the RAM 263.

The CPU 261, the ROM 262, and the RAM 263 are connected to one another through a bus 264. This bus 264 is connected to an input/output interface 265.

The input/output interface 265 is connected to the input unit 266, which includes a keyboard and a mouse, the output unit 267, which is constituted by a display such as an LCD, the storage 268, which is constituted by a hard disk or the like, and a communication unit 269. The communication unit 269 performs communication through a network.

The input/output interface 265 is connected to a drive 270, if necessary. In this drive, a magnetic disk 271, an optical disk 272, a magnetooptical disk 273, a semiconductor memory 274 or the like is appropriately mounted. A computer program is installed in the storage 268, if necessary.

Hereinafter, the configuration shown in FIG. 10 is properly referred to as the configuration of each of the systems shown in FIGS. 4 and 5.

Next, an operation of the sales system having the above-mentioned configuration is described hereinbelow.

Figure 11:
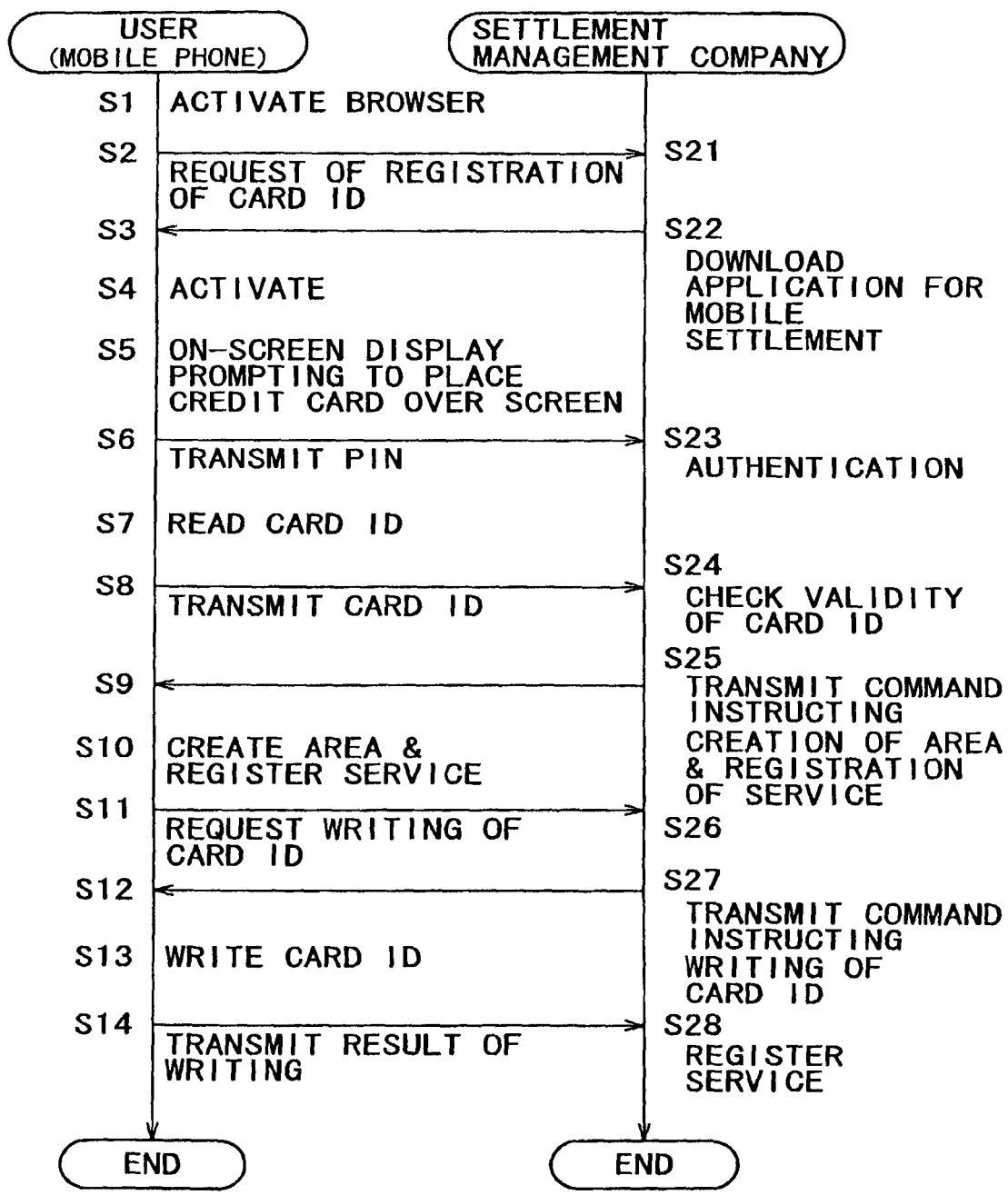
FIG. 11 is a flowchart illustrating an operation of registering a card ID in a mobile phone.

First, an operation of registering a card ID in the mobile phone 1 is described hereunder by referring to a flowchart of FIG. 11.

The CPU 168 of the mobile phone 1 activates the browser 201 by an instruction from a user in step S1. After the browser 201 is activated, in step S2, the communication controller 192 accesses an ordering site managed by the application management server 81 (see FIG. 5) of the card management system 61 through the base station 71 and the mobile phone network 52. Then, the communication controller 192 requests registration of the card ID.

The application management server 81 receives the request from the mobile phone 1 in step S21. Then, the operation advances to step S22, whereupon the downloading of the mobile settlement application is commenced.

The mobile phone 1 receives the mobile settlement application, which is downloaded from the application management server 81, in step S3. Upon completion of downloading, the operation proceeds to step S4, whereupon the mobile settlement application is activated. Thus, the secure client 202 is implemented in the mobile phone 1, so that secure communication is realized between the secure client 202 and the secure server 82 of the card management system 61.

In step S5, the display controller 194 causes the display unit 11 to display a screen prompting a user to place a credit card over the mobile phone 1 (the contactless IC card reader/writer chip 171).

At that time, the screen also prompts the user to input a PIN (Personal Identification Number) preliminarily assigned to the user. The communication controller 192 causes the transmitter 162 to transmit the PIN, which is inputted in response to the prompting, to the application management server 81.

In step S23, authentication of the PIN is performed by the application management server 81 having received the PIC transmitted from the mobile phone 1. If the authentication is successful, a subsequent process is performed.

After the PIN is transmitted and the authentication thereof is performed, the reader/writer controller 212 controls the contactless IC card reader/writer chip 171 and starts searching for (or polling) the contactless IC card provided in the credit card.

According to the prompt displayed in the display unit 11, the user places his credit card 41 over (or brings the credit card 41 close to) the mobile phone 1 as illustrated in FIG. 3A. Thus, the card ID stored in the contactless IC card 41A is read by the contactless IC card reader/writer chip 171.

If detecting that the credit card 41 is brought close to the mobile phone, the reader/writer controller 212 reads a card ID, which is stored in the contactless IC card 41A, in step S7. The card ID read by the reader/writer controller 212 is outputted to the secure client 202.

In step S8, the secure client 202 transmits the card ID to the card management system 61 and requests the system 61 to write the card ID to the memory 181.

In step S24, the authentication section 91 of the card management system 61 receives the card ID transmitted from the mobile phone 1. Furthermore, the card ID is encrypted by the secure client 202 of the mobile phone 1, and transmitted therefrom. Thereafter, the transmitted card ID is decoded by the secure server 82. Other information is encrypted, transmitted and received by the secure server 82 and the secure client 202, if necessary.

Further, in step S24, the authentication section 91 decides according to information stored in a database (not shown) of a credit card company whether or not the card ID transmitted from the mobile phone 1 is valid. Furthermore, the system may be adapted to request the user of the mobile phone 1 to input a password and ID, and to then check the validity of the validity of the card ID according to information on the password and so forth inputted in response to the request.

If the authentication section 9 confirms that the card ID is valid, the SAM 83 of the card management system 61 transmits a command, which instructs the mobile phone 1 to create an area for registering the card ID and to register a service in the created area, through the secure server 82 in step S25. Furthermore, the command to be transmitted to instruct the mobile phone 1 to register the service includes, for example, a service name and identification information of a credit service provided by an issuer of the credit card, which is placed by the user places over the mobile phone 1.

The secure client 202 of the mobile phone 1 receives the command transmitted from the SAM 83 and outputs the received command to the memory manager 213 in step S9. The memory manager 213 creates an area (a card area), in which the card ID is registered, in the common area 181A of the memory 181 and registers the service therein according to the supplied command in step S10.

Upon completion of creating the card area and registering the service, in step S11, the secure client 202 request the card management system 61 to write the card ID to the card area.

In step S26, the request from the mobile phone 1 is received by the SAM 83 of the card management system 61. The SAM 83 generates a command to write the card ID in the card area created in the memory 181 of the mobile phone 1. Then, the operation advances to step S27, whereupon the SAM 83 transmits the command to the mobile phone 1.

The command transmitted from the SAM 83 is received by the secure client 202 and outputted to the memory manager 213 in step S12. The memory manager 213 registers the card ID of the credit card, the registration of which is instructed, in step S13 according to the command, which is transmitted from the SAM 83, by associating the card ID with the service registered in step S10.

Further, the memory manager 203 registers information concerning the expiration date of the card ID (or the credit card) in the memory 181 together with the card ID, if necessary.

FIGS. 12A to 12D are diagrams illustrating an example of a state transition of the memory 181.

Figure 12A:
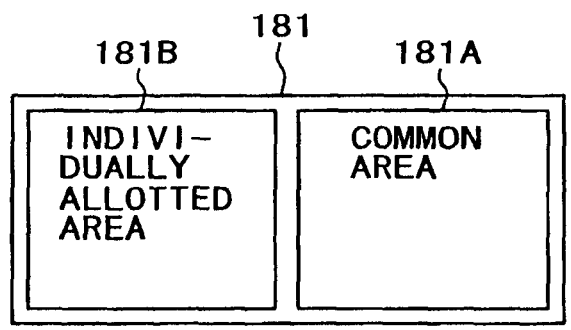
FIGS. 12A to 12D are diagrams illustrating an example of a state transition of a memory.
Figure 12B:
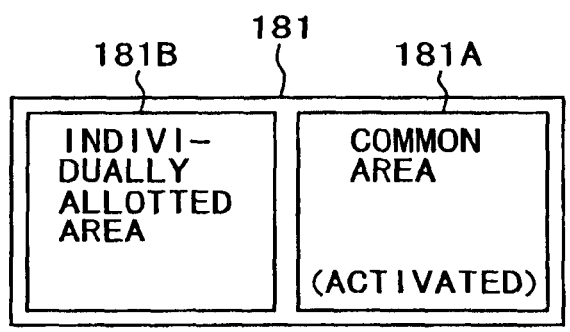
Figure 12C:
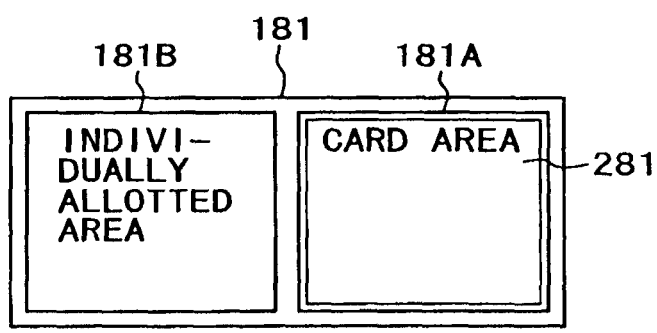
Figure 12D:
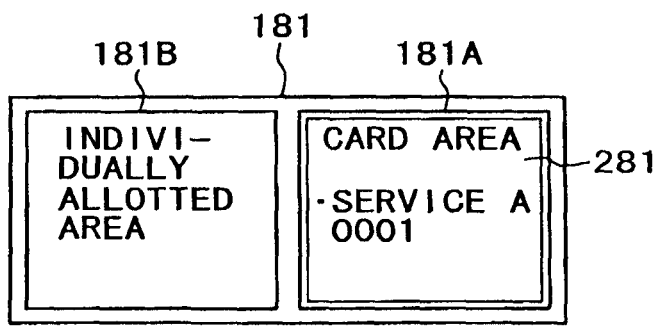

FIG. 12A shows a state of the memory 181 at shipment thereof. The common area 181A is activated, for instance, at a moment (see FIG. 12B), at which the command to create the card area and to register the service is transmitted thereto from the SAM 83. Subsequently, the card area 281 is created (see FIG. 12C).

After the card area 281 is created, information on the credit service and the card ID are registered in the card area 281, as shown in FIG. 11D. In a case of an example shown in FIG. 11D, the service name "SERVICE A" and the card ID "0001" are written to the card area 281.

Upon completion of writing the card ID thereto, in step S14, the secure client 202 notifies the card management system 61 of normal completion of writing the card ID thereto.

The management system 63 having received the notification from the mobile phone 1 in step S28 registers information representing the user of the mobile phone 1 in the member master file 64 as information on a member of the sales system, and then finish the operation.

FIG. 13 is a table illustrating an example of information registered in the member master file 64.

For example, information on the card ID, the card number, the issuer, the expiration date of the credit card, and the member's name, address, and mail-address is registered as information on members of the sales system.

Thus, the address, the mail-address and so on of each of members are preliminarily registered in the member master file 64. Therefore, the user can use the registered address as a shipping address of the merchandise without inputting information on these items at each purchase of a merchandise. Further, the user can use the registered mail-address as a destination address of a confirmation mail from the member store 111.

Furthermore, in the example illustrated in FIG. 13, the card number "0000-0000-0000-000", the issuer "JCC", the expiration date "May 2005 (May 2005)", the member name "YAMADA", the member address "TOKYO", the member mail-address "YAMADA@A.co.jp" of the user's credit card are registered by being associated with the card ID "0001" thereof. Similarly, information on other members is registered. Information on the shipping address and so on is registered by the user by postal mail or through the encrypted communication between the secure server 82 and the secure client 202.

Thus, the card information is registered by the SAM 83 of the card management system 61 after the system confirms that the user of the mobile phone 1 is a contractant of a contract for credit services (an authorized credit card user) or that the card ID is valid. This can prevent occurrence of a dishonest act, such as spoofing. If the user could register the card ID directly in his mobile phone, he could register the card IDs of other users' credit cards therein and also could easily perform dishonest acts, such as spoofing. However, the above-mentioned operation prevents occurrences of dishonest acts.

Moreover, encryption based on key information managed by the secure server 82 and the secure client 202 is performed on information transmitted and received between the mobile phone 1 and the card management system 61. This can prevent leakage of card IDs and so on.

Additionally, the registration of the card ID can be achieved by a more intuitive operation, such as placement of a credit card over a mobile phone. Therefore, a user can register a card ID only by inputting a password without performing cumbersome operations.

Next, another operation of registering the card ID in the mobile phone 1 is described hereinbelow with reference to a flowchart of FIG. 14.

Figure 14:
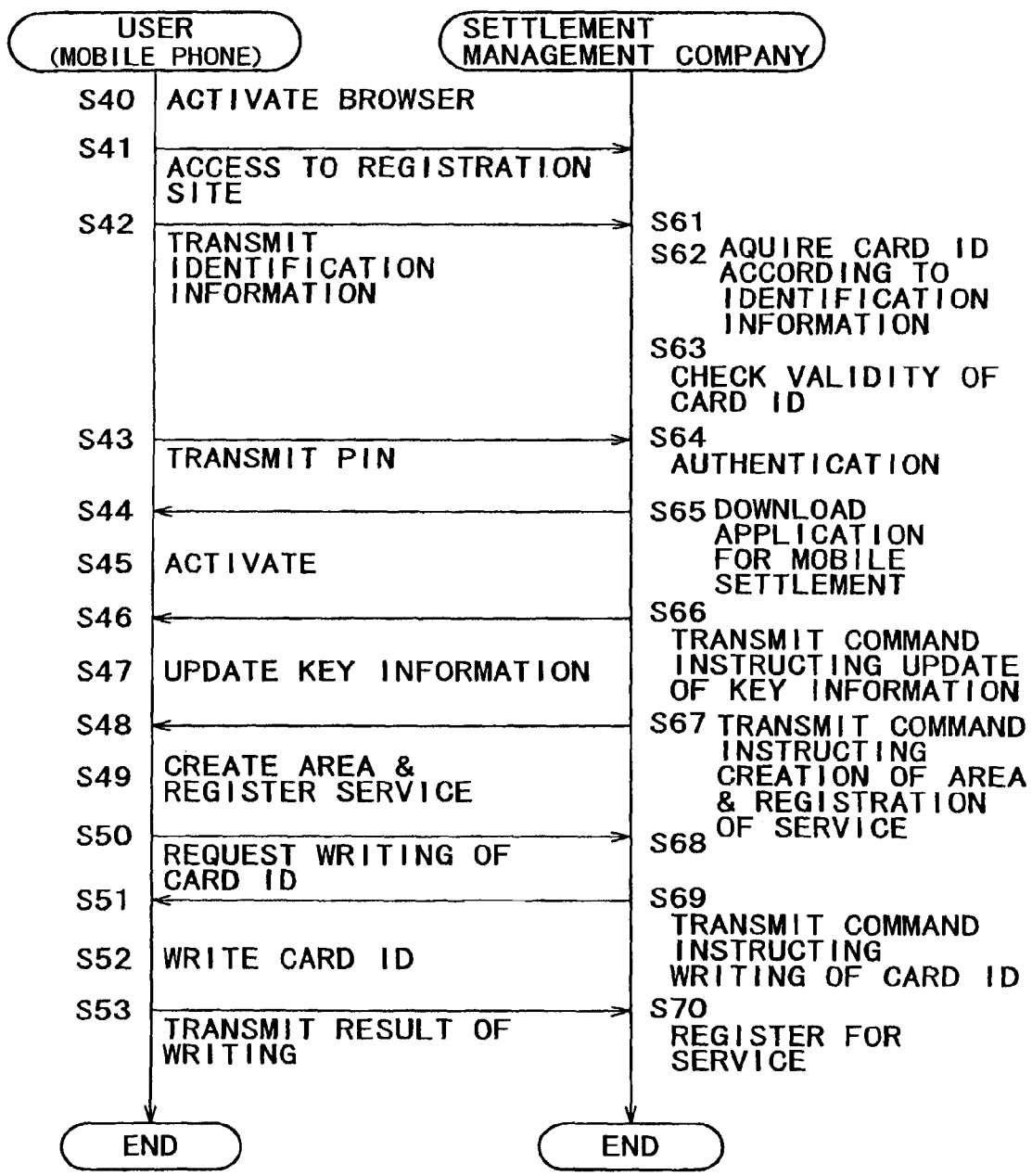
FIG. 14 is a flowchart illustrating another operation of registering a card ID in a mobile phone.

The operation illustrated in FIG. 14 differs from that illustrated in FIG. 11 in that the settlement management company 51 acquires a card ID of a user's credit card and checks the validity thereof according to predetermined identification information transmitted from the mobile phone 1, instead of reading the card ID from the credit card and transmitting the read card ID to the settlement management company 51 (the card management system 61).

Therefore, even If a credit card is not actually (physically) issued, if identification information is issued, a user can register a card ID of a credit card, which is associated with the identification information, in the mobile phone 1.

Basically, the operation illustrated in FIG. 14 is similar to that described by referring to FIG. 11. That is, in step S40, the CPU 168 activates the browser 201 in response to the instruction from the user and accesses a registering site managed by the application management server 81 of the card management system 61.

If accessing the registering site, an input screen for prompting the user to input the identification information issued to the user is displayed in the display unit 11 of the mobile phone 1. Thus, the user inputs the identification information to the input screen.

For example, a password and a service ID, of which the user is preliminarily informed if the credit card is issued, and a number consisting of digits of the predetermined number extracted from a credit card number, and CVV (Card Verification Value) printed on the back surface of the credit card are used as the identification information. Needless to say, all the digits of the credit card number may be used as the identification information. However, from the viewpoint of preventing leakage of the credit card number, it is preferable to use the above-mentioned password and so on.

The identification information inputted by the user is transmitted to the card management system 61 in step S42.

The authentication section 91 of the application management server 81 receives the identification information transmitted from the mobile phone 1 in step S61. Then, the operation proceeds to step S62, whereupon the authentication section 91 acquires the card ID according to the identification information. The card ID, which the user wishes to register, is obtained from the member master file 64, which manages the identification information and the card ID associated with each other, or from the predetermined database of the credit service company.

If the authentication section 91 confirms the validity of the acquired card ID in step S63 and also confirms that this card ID is valid, the authentication section 91 performs the subsequent process.

Additionally, the system may prompt the user to input PIN in addition to the identification information, and may perform authentication according to the inputted PIN. In this case, the communication controller 192 transmits the PIN, which is inputted by the user in response to the prompting, from the transmitter 162 to the application management server 81 in step S43. If the authentication performed in step S64 is successful, the subsequent process is performed.

After the confirmation of the validity of the card ID and the authentication of the PIN, the application management server 81 starts downloading the mobile settlement application in step S65.

Upon completion of downloading of the mobile settlement application received in step S44, the operation advances to step S45, whereupon the CPU 168 of the mobile phone 1 activates the mobile settlement application.

In step S66, the SAM 83 transmits to the mobile phone 1 a command to update tentative key information set in the common area 181A of the memory 181 at shipment thereof.

The memory manager 213 of the mobile phone 1 receives the command, which is transmitted from the SAM 83, in step S46. Then, the operation proceeds to step S47, whereupon the memory manager 213 updates the key information to be set in the card area.

Key information associated with the key information updated in the memory 181 of the mobile phone 1 is provided in the SAM 83 of the card management system 61. Thence, only equipment having the key information can read the card ID stored in the memory 181 of the mobile phone 1.

A process performed between the mobile phone 1 and each of the systems of the settlement management company 51 subsequent to step S48 is similar to that performed from step S9 to step 14, and steps S25 to S28.

That is, in step S67, the SAM 83 of the card management system 61 transmits a command, which instructs to create an area for registering the card ID and to register the service in the created area, to the mobile phone 1. In step S49, the memory manager 213, which obtains this command in step S48, creates a card area and registers the service in step S49.

Upon completion of creating the card area and registering the service, in step S50, the secure client 202 of the mobile phone 1 requests the card management system 61 to write the card ID in the card area. In response to this request, the card ID is written to the card area 281 in step S52 according to the command transmitted from the SAM 83 of the card management system 61.

Upon completion of writing the card ID therein, the secure client 202 notifies the card management system 61 of the normal completion of writing of the card ID. In step S70, information on the user of the mobile phone 1 is registered as information on the member of the sales system. Thereafter, the process is finished.

As above-mentioned, even in the case that the credit card is not actually issued to the user, the user having entered into a contract with the credit service company can register the card ID in the mobile phone 1 and also can perform credit card settlement according to the registered card ID.

After the card ID is registered in the mobile phone 1 in the above-mentioned manner, the user can access the ordering site associated with the predetermined merchandise according to the two-dimensional barcode, whose image is taken by the mobile phone 1, and can offer the purchase of the merchandise, and can perform credit card settlement according to the card ID.

The system may be adapted so that the above registration process is repeated, and that card IDs respectively associated with a plurality of credit cards are registered in the mobile phone 1. In this case, the user selects a predetermined card ID from a plurality of card IDs, and can perform credit card settlement for purchase of a merchandise according to the selected card ID.

Figure 15:
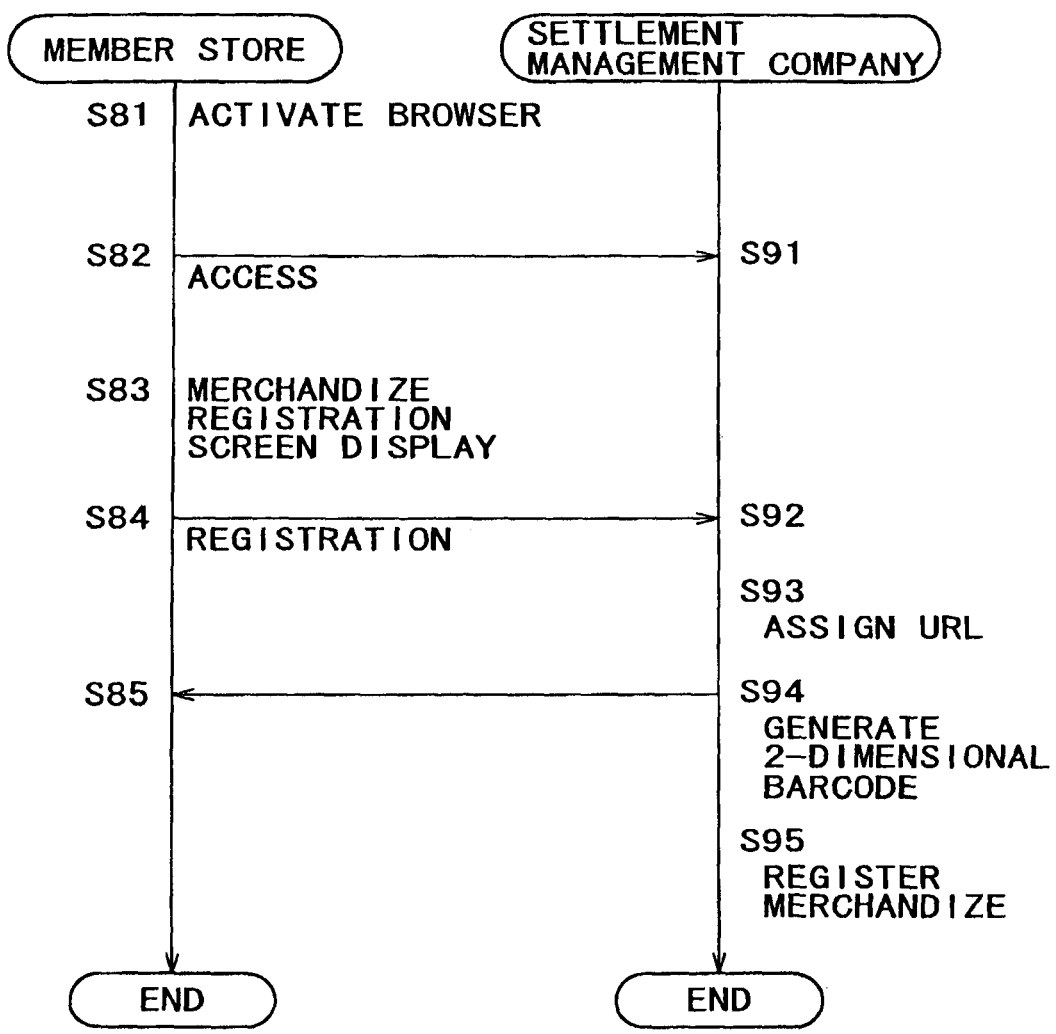
FIG. 15 is a flowchart illustrating merchandise information.

Next, a sequence of operations, by which merchandize information is registered by the member store 111, is described by referring to a flowchart shown in FIG. 15.

For example, if an employee of the member store 111 instructs the system to register the merchandize information, the CPU 261 of the order entry/order placement/inventory management system 121 (see FIG. 10) activates the browser 131. Then, the CPU 261 advances to step S82, whereupon the CPU 261 accesses a registering site for registering the merchandise information. The merchandise information registering site is managed by, for instance, the merchandise information registration section 141 of the management system 63.

If a registration site is accessed, a merchandise registration screen is displayed by the browser 31 in the display unit in step S83.

Figure 16:
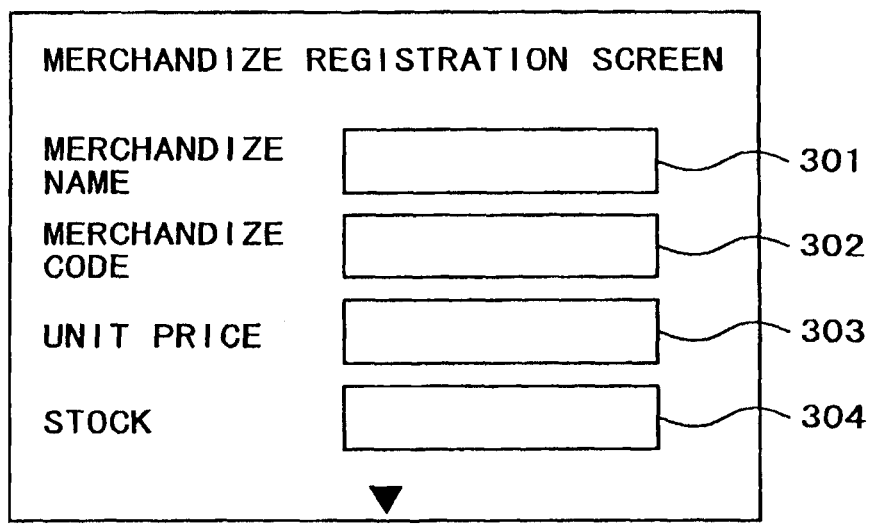
FIG. 16 is a diagram illustrating an example of a merchandise registration screen.

FIG. 16 is a diagram illustrating an example of the merchandise registration screen.

In the merchandise registration column, various kinds of input columns are displayed. The input columns are, for example, a merchandise name input column 301 in which the name of a merchandise whose sales is requested, a merchandise code input column 302 in which the merchandise code thereof is inputted, a unit price input column 303 in which the unit price thereof is inputted, a stock input column 304 in which the quantity of stock is inputted, and other kinds of input columns in which information needed for sale and order-entry of merchandizes.

If predetermined information is inputted in the columns from the merchandize name input column 301 to the stock input column 304 and the registration of the merchandize information is instructed by an employee of the member store 111, the browser 131 transmits the inputted merchandize information to the merchandize information registration section 141 of the management system 63 and requests the merchandize information registration section 141 to register the transmitted merchandize information in step S84.

The merchandize information registration section 141 of the management system 63 receives the request from the browser 131 in step S92. Then, the operation advances to step S93, whereupon the merchandize information registration section 141 assigns a URL (or determines a sURL) of an ordering site, in which the user having an access thereto can place an order, to create the ordering site. The assigned URL is outputted to the two-dimensional barcode generator 142.

In step S94, the two-dimensional barcode generator 142 generates a two-dimensional barcode having a predetermined size, which can be analyzed by the mobile phone 1, by performing predetermined processing, such as scrambling, on the URL assigned by the merchandize information registration section 141. Further, the two-dimensional barcode generator 142 issues the generated two-dimensional barcodes to a designated destination, such as the member store 111, or the advertising agent for advertising the merchandize to be sold by the member store 111 as a representative The two-dimensional barcode is acquired by the member store 111 or the like in step S85. Thereafter, the barcode is printed on advertising media by a printing company.

In step S95, the merchandise information registration section 141 registers the merchandise information in the merchandise master file 62. Then, the operations are finished.

The member stores perform the above-mentioned operations, so that for example, a database as illustrated in FIG. 17 is constructed in the merchandise master file 62.

In the database shown in FIG. 17, the merchandize name of the merchandise, to which the merchandise code "001" is assigned, is "MAGAZINE A". The price of this merchandise is "500 yen". The distribution source of this "MAGAZINE A" is "BOOK STORE A". The quantity of stock of "MAGAZINE A" is "50". The URL of the ordering site assigned to "MAGAZINE A" is "http://WWW.mobile.com/abcshop/". Therefore, the user takes an image of the two-dimensional barcode embedded with this URL by a camera 12. Then, the user instructs an access to this ordering site. Thus, the user can access the ordering site in which he can perform a procedure for purchase of "MAGAZINE A".

In an example shown in FIG. 17, the merchandize name of a merchandize, to which a merchandize ID "002" is assigned, is "Furniture B". The price of the merchandize is "10000 yen". The distributor source of "Furniture B" is "Interior Shop B". The quantity of stock is "10". Additionally, the URL of an ordering site assigned to "Furniture B" is "http://WWW.mobile.com/efgshop/".

The above-mentioned merchandize information is managed by the merchandize master file 62, and read by the ordering site management section 143 and so forth, if necessary. Furthermore, information on features, such as colors and shapes, of merchandizes, contact addresses of member stores, and delivery companies for merchandizes is registered in the merchandize master file 62 by an employee of the member store 111 and indicated in the ordering site associated with a merchandize, if necessary.

As above-mentioned, merchandise information can be registered and the sales of the merchandize can be requested to the settlement management company 51 from a browser, such as Internet Explorer ("Internet Explorer" is a registered trademark of Microsoft Corporation). Thus, even if the member store is a relatively small shop or manufacturer, the sales of merchandizes of the member store can easily be requested.

Even relatively small shops and manufacturers can be affiliated to the settlement management company 51 as the member stores. Thus, the scale of the sales system itself can bee settlement management company 51, so that the sales system itself can be expanded to a large-scale system.

Figure 18:
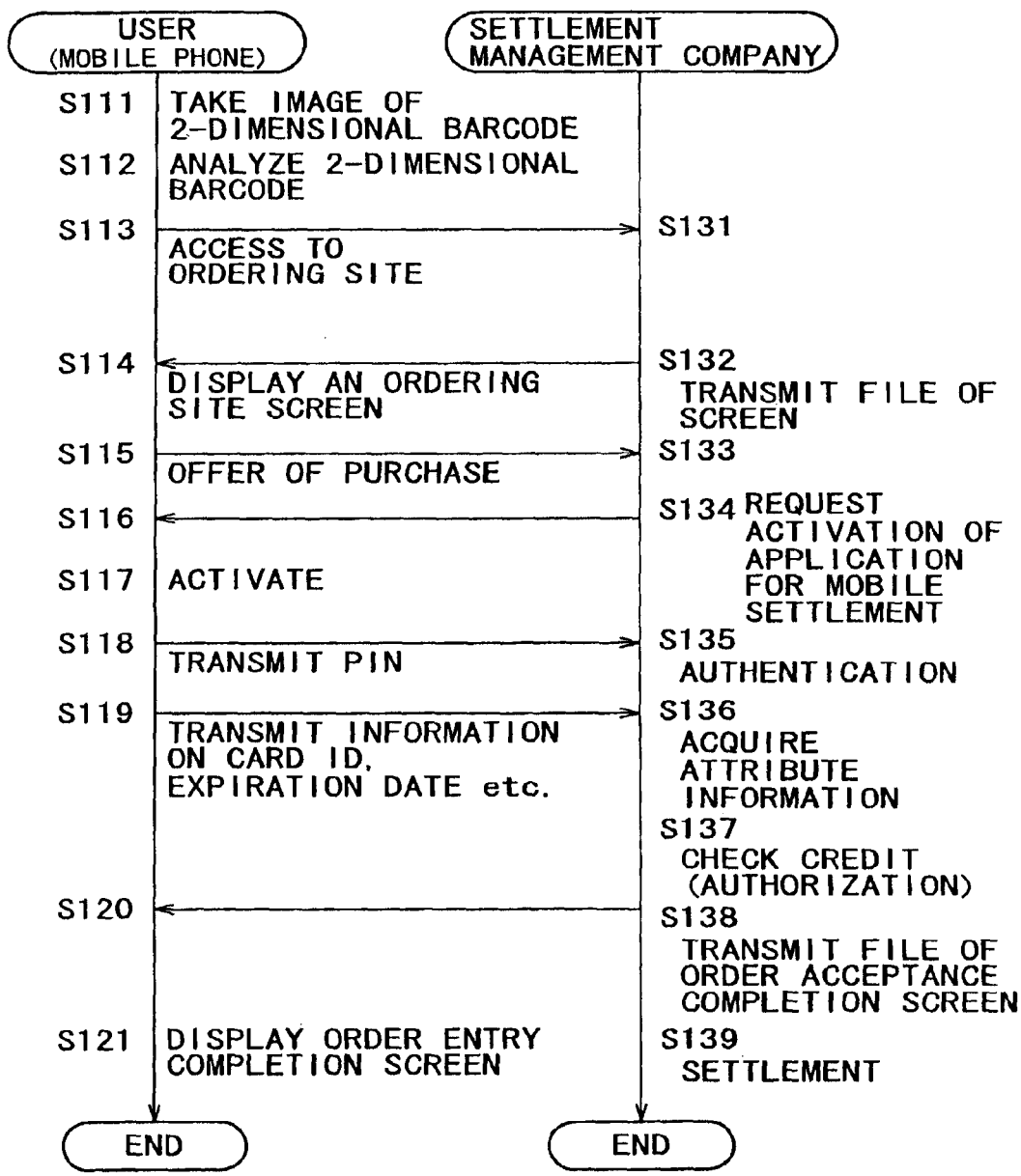
FIG. 18 is a flowchart illustrating a merchandise ordering process.

Next, an operation of ordering a merchandize, which is performed by using the mobile phone 1, is described hereinbelow by referring to a flowchart of FIG. 18.

In step S111, an imaging controller 193 drives a camera 12 in response to an imaging instruction to take an image of a two-dimensional barcode 21A (see FIG. 2A) printed on an advertisement poster in a train. The image including the two-dimensional barcode 21A, which is taken in by the imaging controller 193, is outputted to an image analyzer 191 and a display controller 194. That is, in this case, the operation of ordering a merchandize is performed in, for example, a train.

If a predetermined one of operation buttons 13 is depressed and an access to an ordering site of a merchandize is instructed, the image analyzer 191 analyzes the two-dimensional barcode, which is included in the image supplied from the imaging controller 193, and extracts URL designated by the two-dimensional barcode in step S112. The image analyzer 191 outputs the extracted URL to a communication controller 192 to thereby instruct an access to the ordering site designated by the URL.

A browser 201 of the communication controller 192 accesses the ordering site, in which a procedure for ordering the merchandize is performed according to the URL supplied from the image analyzer 191, in step S113.

If accessed by the mobile phone 1 in step S131, an ordering site management section 143 of the management system 63 transmits a file representing an ordering site screen in step S132.

In step S114, the display controller 194 of the mobile phone 1 causes the display unit 11 to display the ordering site screen according to the file transmitted from the ordering site management section 143.

FIG. 19 is a diagram illustrating an example of the ordering site screen.

The screen shown in FIG. 19 is used for performing a procedure for purchase of a digital camera. Information on the digital camera is displayed on this screen. For example, if an image of the two-dimensional barcode printed in an advertisement poster shown in FIG. 2A (a left-side advertisement poster, as viewed in this figure) is taken and an access to the ordering site is instructed, this screen is displayed.

In the screen shown in FIG. 19, information on the name "Somy" of the member store, which is a distribution source of the digital camera, and the merchandize name "DSC-X", the unit price "30000 yen", and the number "1" of the ordered digital camera is displayed as information on the merchandize, for purchase of which a procedure can be performed. The information on these items is registered by, for instance, an employee of the member store "Somy" according to the above-mentioned process illustrated in FIG. 15.

In a lower part of the screen, a message "would you like to place an order", which is used for inquiring of a user whether or not he offers purchase of the merchandize, is displayed. A purchase button 311 is displayed under this message. The purchase button 311 is made to be active in such a way as to be depressed in synchronization with one operation of one of the operation buttons 13, which is caused by the user. Consequently, the user can place an order of a digital camera, whose merchandize name is "DSC-X", by operating a predetermined one of the operation buttons only once in a state in which the screen shown in FIG. 19 is displayed.

If the purchase button 311 is depressed and placement of an order of the merchandize is instructed, the browser 201 places an order of the merchandise designated by the user in step S115.

The ordering site management section 143 receives an order placed by the mobile phone 1 in step S133, the operation advances to step S134, whereupon the ordering site management section 143 requests the mobile phone 1 to activate the mobile settlement application.

The CPU 168 receives the request from the ordering site management section 143 in step S116 through the receiver 163. Then, the operation proceeds to step S117, whereupon the mobile settlement application preliminarily provided from the card management system 61 by performing the process described with reference to FIGS. 11 and 14 is activated. Thus, the secure client 202 is implemented, so that encrypted communication between the secure client 202 and the secure server 82 of the card management system 61 is enabled.

If the mobile settlement application is activated, the user is prompted to input PIN. The communication controller 192 transmits the PIN, which is inputted in response to the prompting, to the application management server 81 in step S118.

In step 135, the application management server 81 having received the PIN transmitted from the mobile phone 1 performs authentication of the PIN. If the authentication is successful, the subsequent process is performed.

In step S119, the secure client 202 transmits information on the card ID, the expiration date and so on thereof, which are registered in the memory 181 by performing the process illustrated in FIG. 11 or 14, and requests the credit card settlement according to the card ID.

In step S136, the ordering site management section 143 of the management system 63 receives the information, which represents the card ID, the expiration date and so on and is transmitted from the mobile phone 1, through the secure server 82. Then, the ordering site management section 143 outputs the received information to an order entry section 144 together with information on the price of the merchandise read from the merchandize master file 62.

In step S136, the order entry section 144 acquires attribute information registered in the member master file 64 in such a way as to be associated with the card ID. That is, the order entry section 144 acquires information representing, for instance, the card number, the issuer, and the expiration date of the credit card issued from the company providing the credit service, the member of which the user has become, and also representing the name, the address, the mail-address and so forth of the user, from the database constructed in the member master file 64 and shown in FIG. 13.

In step S137, the order entry section 144 accesses the database of the credit service company or the bank according to information representing the credit card number, which is obtained from the member master file 64, and then perform credit-checking (authorization). If the credit checking is successful, the order entry section 144 transmits a file, which is used for displaying a screen informing the user of completion of an order entry, to the mobile phone 1 in step S138.

Thereafter, the order entry section 144 performs settlement for the merchandize, an order of which the user has placed, in step S139. The order entry section 144 transmits information, which represents the card number of the user's credit card and an amount of payment, to the issuer of the credit card, and also requests the issuer to deduct the payment from an account designated by the user and to transfer the deducted money into an account of the member store 111.

Furthermore, this settlement (the request to the issuer of the credit card) maybe performed at predetermined intervals, for example, every day, or if the user confirms an order entry by performing a process (to be described later). In this case, the order entry section 144 retains information on the credit card number and an amount of the payment, which is acquired from the member master file 64, until the order entry section 144 makes the requests to the issuer of the credit card.

On the other hand, in step S120, the display controller 194 receives the file transmitted from the management system 63 through the secure client 202, and causes the display unit 11 to display the screen for informing the user of completion of order entry. The information transmitted from the management system 63 includes an order entry number for identifying the order entry performed at that time. For instance, the order entry number is displayed in the display unit 11. This process completes the order entry of the merchandise by the mobile phone 1.

As above-mentioned, the user can access directly to an ordering site associated with a merchandize by taking an image of the two-dimensional barcode printed on an advertisement and then performing a predetermined operation, such as one-click operation. Thus, a user can casually and quickly perform order entry of a merchandize by simultaneously watching an advertisement.

Further, the user can perform credit card settlement for purchase of a merchandize according to the card ID registered in the mobile phone 1. Thus, this embodiment can save the user's trouble of inputting the card number and the expiration date of the user's credit card at each settlement. Moreover, this embodiment can prevent leakage of the credit card number, which would be caused by transmitting information representing the credit card number through a network.

As compared with a conventional sales system using a mobile phone 1, which accesses a predetermined shopping site and searches for a merchandize to be purchased, and performs order entry of purchase of the merchandize, the sales system according to this embodiment can provide more detail information on a merchandise to a user, whose is a customer, by using advertising media, such as paper. That is, in the case of advertisement displayed on the screen of the mobile phone 1, there is a limit to information that can be provided to users. Especially, some images displayed thereon cannot fully show the appeal of a merchandize. However, for example, advertisement posters in a train or the like can fully show the appeal of a merchandize. This can encourage users to buy the merchandize. In other words, according to this embodiment, an order entry procedure is easy to perform. Thus, in comparison with the conventional sales system, this embodiment can increase sales of the merchandize.

Although it has been described in the foregoing description that the mobile phone 1 itself analyzes the two-dimensional barcode and extracts URL therefrom, the system may be modified so that the taken image (including the two-dimensional barcode) is transmitted to a predetermined server, that the mobile phone 1 is notified of a URL, which is obtained as a result of the analysis thereof, and that then, an access to an ordering site can be made. Thus, even in a case that the mobile phone 1 does not have the function of analyzing a 2-dimensional barcode, as long as a camera is provided therein, a user can directly access the ordering site and can perform the subsequent procedure.

Although it has been described in the foregoing description that the user can perform a procedure for ordering a merchandize by accessing an ordering site and using a screen then displayed, the system may be adapted so that data for causing the mobile phone 1 to display an ordering screen similar to that of the ordering site is embedded in the two-dimensional barcode itself printed on the advertisement, and that the ordering screen is displayed according to a result of analysis of the two-dimensional barcode, which is performed by the mobile phone 1, instead of accessing the ordering site in that manner. If the user instructs the mobile phone 1 in the ordering screen to perform order entry of purchase of a merchandize, only information on the merchandize ID, the card ID, the expiration date, and so on is transmitted from the mobile phone 1 to the settlement management company 51. Thus, an amount of communication data can be reduced. Consequently, communication cost needed for ordering can be suppressed.

Figure 20:
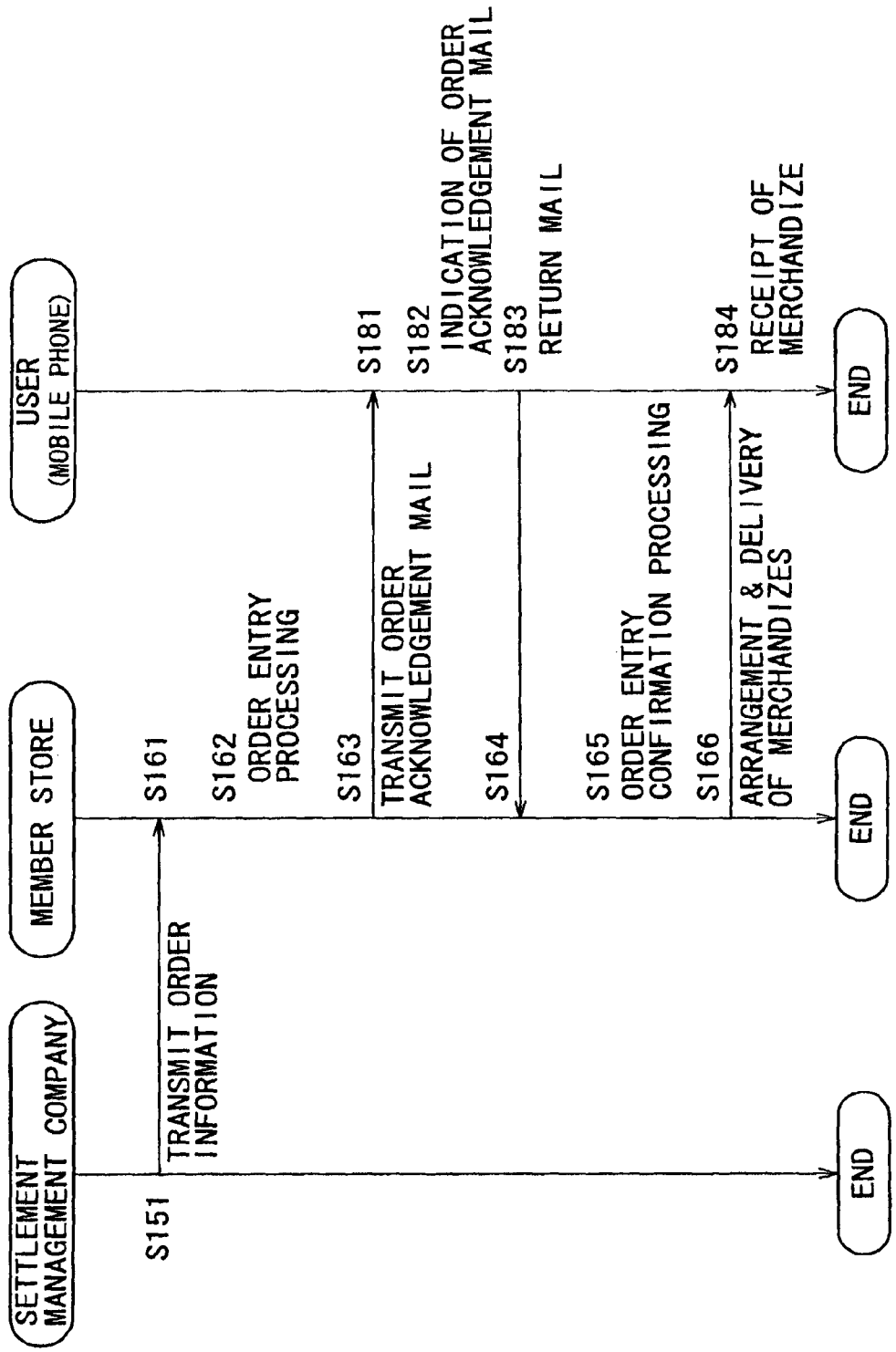
FIG. 20 is a flowchart illustrating a sequence of operations to delivery of a merchandise.

Next, a sequence of processes to be performed subsequently to the process illustrated in FIG. 18 up to delivery of the merchandize is described hereinbelow by referring to a flowchart of FIG. 20.

In step S151, an order placement section 145 of the management system 63 transmits order information to the order entry/order placement/inventory management system 121 of the member store 111. The order information includes attribute information, shipping address information, and information representing the merchandize code, the price, a result of authorization, an order entry number, a mail-address of the mobile phone land so forth, in addition to information required to inform the system 121 of completion of the settlement (step S39 shown in FIG. 18).

In step S161, the order entry/order placement/inventory management system 121 receives the order information transmitted from the management system 63. Then, the process advances to step S162, whereupon the order entry/order placement/inventory management system 121 performs order entry processing. Subsequently, the process proceeds to step S163, whereupon the order entry/order placement/inventory management system 121 transmits an order acknowledgement mail to the mobile phone 1 according to the mail address of the mobile phone 1, which is included in the order information.

The order acknowledgement mail is received by the mobile phone 1 in step S181. Then, the information included in the order acknowledgement mail is displayed in the display unit 11.

FIG. 21 is a diagram illustrating an example of indication of the order acknowledgement mail.

As shown in FIG. 21, information representing the name "DSC-X", the price "30,000 yen", the number "1" of the ordered merchandise, and also representing the name "YAMADA" of the person who placed the order, and the shipping address "TOKYO" is displayed as information represented by the order entry confirmation mail, in order to make the user confirm the information. The information representing the name of the person, who placed the order, and the shipping address is obtained from the member master file 64 and provided to the order entry/order placement/inventory management system 121 by being included in the order information.

In a lower part of the screen, a confirmation button 321 to be operated at confirmation of the order entry is displayed. The user can confirm the order entry of purchase of the merchandize, the name of which is "DSC-X", by depressing this confirmation button 321.

If this confirmation button 321 is depressed, a return mail used for informing of confirmation of the order entry is transmitted from the mobile phone 1 to the order entry/order placement/inventory management system 121 in step S183.

In step S164, the order entry/order placement/inventory management system 121 receives the return mail from the mobile phone 1 through a mail server 122. Then, the process advances to step S165, whereupon the order entry/order placement/inventory management system 121 performs order confirmation processing. For instance, the order entry/order placement/inventory management system 121 performs an operation of subtracting the quantity of stock of the merchandize by the number of the ordered merchandizes, an operation of searching for a delivery company, or an operation of notifying the settlement management company 51 of the confirmation of the order entry as the order confirmation processing. Moreover, in step S166, the order entry/order placement/inventory management system 121 arranges the delivery of the merchandise and actually causes the delivery company to deliver the merchandize.

In step S184, the delivered merchandize is received by the user of the mobile phone 1 at a place designated as the shipping address. Thus, the process is finished.

The ordering of a merchandize, the order entry, the order placement, the delivery of the merchandise, and so on are performed in the sales system of FIG. 4 in the above-mentioned manner.

Although it has been described in the foregoing description that the order acknowledgement mail is transmitted from the member store 111, needless to say, the order acknowledgement mail may be transmitted from the mail server of the settlement management company 51.

FIG. 22 is a diagram illustrating contact relations and flows of money transfers in the above-mentioned sales system.

As illustrated in this figure, a member store contract is concluded between the settlement management company 51 and the member store 111 so that the settlement management company 51 manages the sales of merchandizes, and that the member store 111 utilizes the sales system. The member store 111 pays a fee for utilizing the sales system (a member store fee) to the settlement management company 51. The member store fee from the member store 111 is received by an accounting system 331.

A contract is concluded between the settlement management company 51 and a credit card member (the user) 341 so that the settlement management company 51 provides a card service (what is called a family card service) similar to a credit service to the mobile phone 1 that the card member 341 has, and that the card member 341 can use the card settlement service. The card member 341 pays the settlement management company 51 an annual fee as a consideration for providing the family card service to the user, and also pays a card member service charge as a consideration for using the sales system. The fee and charge from the card member 341 is received by an accounting system 332.

If the settlement management company 51 differs from a contactless IC card management company 342 for managing the contactless IC card reader/writer chip 171 incorporated into the mobile phone 1 that the card member 341 has, contracts (a common area usage contract and a card issuance service contract under which the contactless IC card management company 342 provides services of registering the card ID and so forth) are concluded between the settlement management company 51 and the contactless IC card management company 342 so that the contactless IC card management company 342 manages the contactless IC card service. The settlement management company 51 pays fees (a common area activation fee and an area registration license fee) to the contactless IC card management company 342.

Moreover, if necessary, the settlement management company 51 pays an application fee (a licensing fee for the mobile settlement application) to a mobile phone carrier (a communication company) 343 with which the card member 341 has made a contract.

Thus, the above-mentioned fees are paid by the member store 111 and the card member 341 to the settlement management company 51 for managing the sales system. Consequently, the settlement management company 51 can make a profit from these fees.

In the foregoing description, it has been described that the contactless IC card reader/writer chip 171, that is, a module having both the function of a contactless IC card and the function of a reader/writer is provided in the mobile phone 1. However, as above-mentioned, settlement using the card ID registered according to the identification information (that is, registered by performing the process illustrated in FIG. 14) can be performed by providing only a module, which simply implements the function of the contactless IC card, in the mobile phone 1. The module simply implementing the function of a contactless IC card is, for example, a Felica ("Felica" is a registered trademark of Sony Corporation).

Although the system employing the mobile terminal 1 as a terminal, in which the card information is registered, has been described in the foregoing description, the sales system maybe adapted so that the card ID is registered in PDA (Personal Digital Assistant) or a notebook personal computer, instead of the mobile phone, and that settlement using this card ID is enabled.

In the foregoing description, the case, in which the user of the mobile phone 1 performs purchase of a predetermined merchandize, has been described. The "purchase of a (predetermined) merchandize" includes a "service contract".

Further, it has been described that the two-dimensional barcode is printed on the advertising medium as a code representing an address of the ordering site. However, any other code may be used as the code representing the address of the ordering site, as long as the code can identifies the ordering site and enables the user (or the mobile phone 1) to access the ordering site. For example, a one-dimensional barcode obtained by arranging monochrome patterns only in a lateral direction, and an alphanumerical character string consisting of a predetermined number of digits may be used as the code representing the address of the ordering site.

In the foregoing description, it has been described that the addresses of the ordering sites are taken in by the camera 12 of the mobile phone 1. However, If a contactless IC card (a wireless communication chip), such as a "Felica" (a registered trademark) card, is provided at a predetermined place in an advertising medium, an address stored in the contactless IC card may be taken in by the contactless IC card reader/writer chip 171 of the mobile phone 1.

Figure 23A:
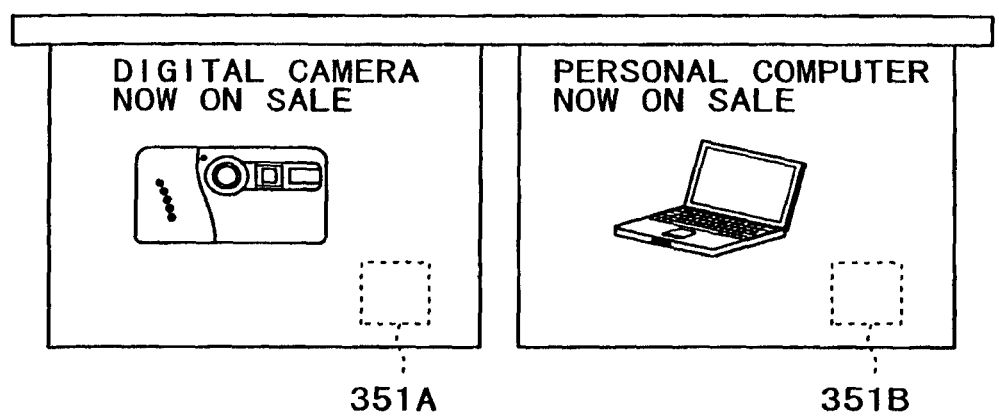
FIGS. 23A and 23B are diagrams illustrating other examples of advertising media.
Figure 23B:
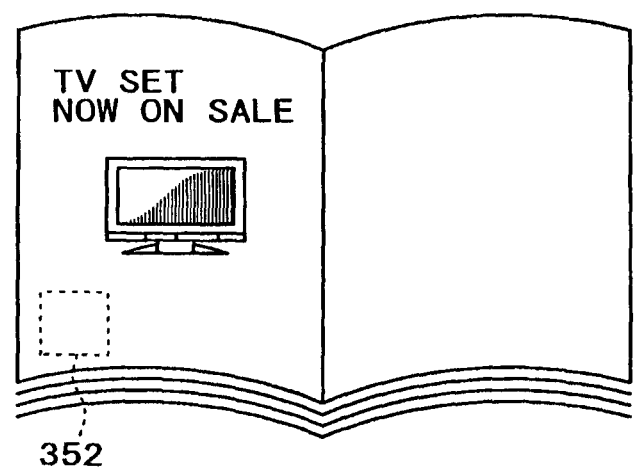

FIGS. 23A and 23B are diagrams illustrating other examples of advertising media, which correspond to the advertising media shown in FIGS. 2A and 2B, respectively.

In each of the advertising media respectively shown in FIGS. 23A and 23B, an associated one of contactless IC cards 351A, 351B, and 352, from which information can be read by the contactless IC card reader/writer chip 171, is provided at a place corresponding to a position of the printed two-dimensional barcode of an associated one of the advertising media respectively shown in FIGS. 2A and 2B.

In a case that the contactless IC cards 351A, 351B, and 352 are provided in the advertising media in this manner, a user causes his mobile phone 1 to read the addresses stored in the contactless IC cards 351A, 351B, and 352 by bringing the mobile phone 1 close to these contactless IC cards. Thus, the user can directly access the ordering sites without manually inputting URLs of the ordering sites to the mobile phone 1.

In the foregoing description, it has been described that the card ID is stored in the memory 181 of the mobile phone 1, and that the management system 63 acquires the information concerning the credit card number and so on according to the card ID. However, needless to say, the system may be adapted so that the information representing the credit card number, the expiration date of the credit card and also representing the name and so forth of the user is stored directly in the memory 181, and that settlement is performed according to the information directly stored in the memory 181.

Although the above-mentioned sequence of processes can be performed by hardware, these processes may be performed by software.

If the sequence of processes is performed by software, programs constituting the software are installed in a computer incorporated in dedicated hardware or, for example, a general-purpose computer or the like, which is enabled by installing various kinds of programs therein to perform various kinds of functions, from a network or from a recording medium.

This recording medium is constituted by a package medium, which is distributed separately from a main unit of an apparatus to provide programs to users and which includes a magnetic disk 271 (including a flexible disk), an optical disk 272 (including a CD-ROM (Compact Disk-Read Only Memory)) and a DVD (Digital Versatile Disk)), a magneto-optical disk 273 (including a MD (Mini-Disk) ("MD" is a registered trademark of Sony Corporation)), or a semiconductor memory 274. Alternatively, the recording medium is constituted by ROM 262, in which programs are recorded, and a hard disk or the like included in a storage 268, which are provided to users by preliminarily being incorporated into the main unit of the apparatus.

Furthermore, in the present specification, the steps describing programs recorded in a recording medium include not only processing performed chronologically in the order in which the steps are described but also processing performed in parallel or individually, though this processing is not necessarily performed in chronological order.

It should be understood by those skilled in the art that various modifications, combinations, sub-combinations and alterations may occur depending on design requirements and other factors insofar as they are within the scope of the appended claims or the equivalents thereof.

Obviously, numerous modifications and variations of the present invention are possible in light of the above teachings. It is therefore to be understood that within the scope of the appended claims, the invention may be practiced otherwise than as specifically described herein.

The invention claimed is:

1. A system, comprising:
a portable terminal including a processor having a connection unit with a memory configured to be partitioned into a plurality of areas; and
an interface configured to download a mobile settlement application, wherein, when executed by the processor of the portable terminal, the mobile settlement application (i) controls the portable terminal to display a user interface that receives an input personal identification information, and (ii) controls a receiver of the mobile terminal to receive authentication information including an identification of a card; and
a server configured (i) to receive from the portable terminal the card identification and the personal identification information, (ii) to authenticate the personal identification information and validate the card identification, and (iii) to transmit, when the personal identification information is authenticated and the card identification is validated, a command to the portable terminal instructing the mobile settlement application to execute a process to store the card identification in an area of the memory of the portable terminal exclusively accessible by a predetermined company.

2. The system of claim 1, wherein the authentication information further includes at least one of an expiration date of the card and an account number associated with the card.

3. The system of claim 1, wherein the portable terminal and the server communicate using a wireless network and the internet.

4. The system of claim 1, wherein the command transmitted by the portable terminal is a secure command.

5. The system of claim 1, wherein the card has an IC chip and the receiver receives the authentication information from the IC chip wirelessly.

6. A portable terminal, comprising:
a processor having a connection unit with a memory configured to partitioned into a plurality of areas; and
an interface configured to download a mobile settlement application, wherein, when executed by the processor of the portable terminal, the mobile settlement application (i) controls the portable terminal to display a user interface that receives an input personal identification information, and (ii) controls a receiver of the mobile terminal to receive authentication information including an identification of a card, wherein the interface is configured to transmit to a server the card identification and the personal identification information, and the card identification is validated, a command instructing the mobile settlement application to execute a process to store the card identification in an area of the memory of the portable terminal exclusively accessible by a predetermined company.

7. The portable terminal of claim 6, wherein the authentication information further includes at least one of an expiration date of the card and an account number associated with the card.

8. The portable terminal of claim 6, wherein the portable terminal and the server communicate using a wireless network and the internet.

9. The portable terminal of claim 6, wherein the transmitted command is a secure command.

10. The portable terminal of claim 6, wherein the card has an IC chip and the receiver receives the authentication information from the IC chip wirelessly.

11. A computer for validating authentication information including an identification of a card, the computer comprising:
a processor configured (i) to control an interface to receive, from the portable terminal, the card identification and a personal identification information, (ii) to authenticate the personal identification information and validate the card identification, and (iii) to control the interface to transmit, when the personal identification information is authenticated and the card identification is validated, a command to the portable terminal instructing a mobile settlement application downloaded by the portable terminal to execute a process to store the card identification in an area of a memory possible to connect with the processor exclusively accessible by a predetermined company.

12. The computer of claim 11, wherein the authentication information further includes at least one of an expiration date of the card and an account number associated with the card.

13. The computer of claim 11, wherein the portable terminal and the server communicate using a wireless network and the internet.

14. The computer of claim 11, wherein the command transmitted by the portable terminal is a secure command.

15. The computer of claim 11, wherein the card has an IC chip and the portable terminal receives the authentication information from the IC chip wirelessly.

16. A method, comprising:
- partitioning a memory possible to connect with a processor of a portable terminal into a plurality of areas;
- downloading, at the portable terminal, a mobile settlement application, wherein, when executed by the processor of the portable terminal, the mobile settlement application (i) controls the portable terminal to display a user interface that receives an input personal identification information, and (ii) controls the portable terminal to receive authentication information including an identification of a card;
- receiving at a server the card identification and information and the personal identification information;
- authenticating the personal identification information and validating the card identification; and
- transmitting, when the personal identification information is authenticated and the card identification is validated, a command to the portable terminal instructing the mobile settlement application to execute a process to store the card identification in an area of the memory of the portable terminal exclusively accessible by a predetermined company.

17. The method of claim 16, wherein the authentication information further includes at least one of an expiration date of the card and an account number associated with the card.

18. The method of claim 16, wherein the portable terminal and the server communicate using a wireless network and the internet.

19. The method of claim 16, wherein the transmitted command is a secure command.

20. The method of claim 16, wherein the card has an IC chip and the portable terminal receives the authentication information from the IC chip wirelessly.

* * * * *